(12) United States Patent
Adair et al.

(10) Patent No.: US 7,537,647 B2
(45) Date of Patent: May 26, 2009

(54) AIR PURIFIER

(75) Inventors: Joel E. Adair, Racine, WI (US); Rene Maurice Beland, Waterford, WI (US); James R. Crapser, Racine, WI (US); C. Scott Eagleton, Chicago, IL (US); Thomas P. Gasper, Germantown, WI (US); Dennis W. Gruber, Arlington Heights, IL (US); Jeffrey L. Harwig, New Berlin, WI (US); Padma Prabodh Varanasi, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 341 days.

(21) Appl. No.: 11/442,940

(22) Filed: May 30, 2006

(65) Prior Publication Data

US 2007/0034082 A1 Feb. 15, 2007

Related U.S. Application Data

(60) Provisional application No. 60/707,350, filed on Aug. 11, 2005, provisional application No. 60/707,076, filed on Aug. 10, 2005.

(51) Int. Cl.
*B03C 3/011* (2006.01)
(52) U.S. Cl. ............................. 96/62; 55/434; 55/462; 55/467; 96/63; 96/97; 96/222; 261/DIG. 88
(58) Field of Classification Search ............... 96/60, 96/62, 63, 97, 222; 55/434, 462, 465, 467; 261/DIG. 88
See application file for complete search history.

(56) References Cited

U.S. PATENT DOCUMENTS 912,106 A 2/1909 Frazier

| 1,372,251 | A | 3/1921 | Schnee |
|---|---|---|---|
| 2,044,832 | A | 6/1936 | Child |
| 2,065,970 | A | 12/1936 | Hartzell |
| 2,335,056 | A | 11/1943 | Grison |
| 2,528,301 | A | 10/1950 | Doe |
| 2,611,068 | A | 9/1952 | Wellens |
| 2,638,644 | A | 5/1953 | Rauhut |
| 2,746,416 | A | 5/1956 | Aufderheide |
| 2,825,318 | A | 3/1958 | Mansfield |
| D189,420 | S | 12/1960 | Diehl |

(Continued)

FOREIGN PATENT DOCUMENTS

DE 3623731 1/1988

(Continued)

*Primary Examiner*—Richard L Chiesa

(57) ABSTRACT

The present invention is an air purifier including an ionizing assembly that operates to charge particulate material in an air flow passing through the purifier. The charged particulate material is attracted to and retained by a filter element disposed downstream of the ionization assembly and having an electrical charge opposite to the charged particulate material. The purified air passing through the filter is directed out of the device, optionally in conjunction with a fragrance that is added to the purified air flow. The ionizing assembly is formed with a ground member disposed adjacent the ionizing member to keep the electrons generated by the ionizing assembly within the purifier, and thus prevent static discharges from occurring outside of the purifier. The air flow is directed by a fan through the purifier in an angular and substantially laminar manner, such that the efficiency of the purifier is increased.

13 Claims, 15 Drawing Sheets

U.S. PATENT DOCUMENTS

| | | | |
|---|---|---|---|
| 3,297,209 A | 1/1967 | Punaitore | |
| 3,458,794 A | 7/1969 | Bohnstedt et al. | |
| 3,474,376 A | 10/1969 | Preiss | |
| D216,794 S | 3/1970 | Patrick | |
| 3,600,590 A | 8/1971 | Einstein | |
| 3,624,161 A | 11/1971 | Bub | |
| 3,745,750 A | 7/1973 | Arff | |
| 3,757,495 A | 9/1973 | Seivers | |
| 3,768,258 A * | 10/1973 | Smith et al. | 60/275 |
| 3,776,177 A | 12/1973 | Bryant et al. | |
| 3,860,404 A | 1/1975 | Jochimski | |
| 3,860,818 A | 1/1975 | Stalder et al. | |
| D234,606 S | 3/1975 | Gamble | |
| 3,873,835 A | 3/1975 | Ignatiev | |
| 3,921,568 A | 11/1975 | Fish | |
| 3,923,934 A | 12/1975 | Watkins | |
| 3,936,284 A | 2/1976 | Mason | |
| 3,948,445 A | 4/1976 | Andeweg | |
| 4,004,361 A | 1/1977 | McVeety | |
| 4,006,841 A | 2/1977 | Alticosalian | |
| 4,040,568 A | 8/1977 | Mason, Jr. et al. | |
| 4,043,776 A | 8/1977 | Orel | |
| 4,059,422 A | 11/1977 | Steiner | |
| 4,118,191 A | 10/1978 | Bohnensieker | |
| 4,121,529 A | 10/1978 | Smith et al. | |
| 4,121,916 A | 10/1978 | Fricke | |
| 4,173,995 A | 11/1979 | Beck | |
| 4,177,045 A | 12/1979 | Orel | |
| 4,210,429 A | 7/1980 | Gostein | |
| 4,214,146 A | 7/1980 | Schimanski | |
| 4,214,882 A | 7/1980 | Brenholt | |
| 4,219,531 A | 8/1980 | Wisniewski | |
| 4,244,710 A * | 1/1981 | Burger | 95/69 |
| 4,272,261 A | 6/1981 | Lynch, Jr. et al. | |
| 4,301,095 A | 11/1981 | Mettler et al. | |
| 4,317,661 A | 3/1982 | Sasaoka et al. | |
| 4,344,776 A | 8/1982 | Yavnelli | |
| 4,467,263 A | 8/1984 | Conforti et al. | |
| 4,605,425 A | 8/1986 | Verrando et al. | |
| 4,629,482 A | 12/1986 | Davis | |
| 4,647,831 A | 3/1987 | O'Malley et al. | |
| 4,666,638 A | 5/1987 | Baker et al. | |
| 4,694,142 A | 9/1987 | Glucksman | |
| 4,701,195 A | 10/1987 | Rosendall | |
| 4,711,161 A | 12/1987 | Swin, Sr. et al. | |
| 4,719,662 A | 1/1988 | Horak et al. | |
| 4,731,520 A | 3/1988 | Glucksman et al. | |
| D295,217 S | 4/1988 | Glucksman | |
| 4,737,173 A | 4/1988 | Kudirka et al. | |
| 4,743,406 A | 5/1988 | Steiner et al. | |
| 4,743,829 A | 5/1988 | Fenne et al. | |
| D296,468 S | 6/1988 | Greubel | |
| 4,792,345 A | 12/1988 | Abe et al. | |
| 4,795,883 A | 1/1989 | Glucksman et al. | |
| 4,804,821 A | 2/1989 | Glucksman | |
| 4,830,791 A | 5/1989 | Muderlak et al. | |
| 4,839,014 A | 6/1989 | Park et al. | |
| 4,849,862 A | 7/1989 | Diskin et al. | |
| 4,859,220 A | 8/1989 | Leber et al. | |
| 4,873,422 A | 10/1989 | Streich et al. | |
| D305,260 S | 12/1989 | Mito | |
| D307,050 S | 4/1990 | Glucksman et al. | |
| 4,917,862 A | 4/1990 | Kraw et al. | |
| 4,919,693 A | 4/1990 | Olney | |
| 4,931,224 A | 6/1990 | Holzner, Sr. | |
| 4,937,912 A | 7/1990 | Kurz | |
| 4,942,841 A | 7/1990 | Drucker, Jr. | |
| 4,973,827 A | 11/1990 | Nozaki | |
| 4,986,901 A | 1/1991 | Nohren, Jr. et al. | |
| 4,997,381 A | 3/1991 | Oh | |
| 5,006,779 A | 4/1991 | Fenne et al. | |
| 5,014,338 A | 5/1991 | Glucksman | |
| 5,035,728 A | 7/1991 | Fang | |
| 5,036,698 A | 8/1991 | Conti | |
| 5,038,394 A | 8/1991 | Hasegawa et al. | |
| 5,061,296 A | 10/1991 | Sengpiel et al. | |
| 5,089,144 A | 2/1992 | Ozkahyaoglu et al. | |
| 5,089,202 A | 2/1992 | Lippold | |
| D325,253 S | 4/1992 | Muderlak | |
| 5,111,477 A | 5/1992 | Muderlak et al. | |
| 5,111,529 A | 5/1992 | Glucksman | |
| 5,112,370 A | 5/1992 | Gazzano | |
| 5,131,932 A | 7/1992 | Glucksman | |
| 5,133,788 A | 7/1992 | Backus | |
| D328,637 S | 8/1992 | Muller et al. | |
| 5,139,546 A | 8/1992 | Novobilski | |
| 5,160,879 A | 11/1992 | Tortola et al. | |
| 5,163,202 A | 11/1992 | Kawakami et al. | |
| 5,192,342 A | 3/1993 | Baron et al. | |
| 5,210,818 A | 5/1993 | Wang | |
| 5,220,152 A | 6/1993 | Doran | |
| 5,220,636 A | 6/1993 | Chang | |
| 5,230,723 A | 7/1993 | Travis et al. | |
| D338,521 S | 8/1993 | Ganor | |
| D338,709 S | 8/1993 | Lin | |
| 5,236,477 A | 8/1993 | Koketsu | |
| 5,239,610 A | 8/1993 | Shao | |
| 5,240,478 A | 8/1993 | Messina | |
| 5,250,232 A | 10/1993 | Pepper et al. | |
| 5,266,004 A | 11/1993 | Tsumurai et al. | |
| D345,010 S | 3/1994 | Aronsson et al. | |
| 5,290,546 A | 3/1994 | Hasegawa et al. | |
| 5,330,722 A | 7/1994 | Pick et al. | |
| 5,332,425 A | 7/1994 | Huang | |
| 5,377,614 A | 1/1995 | Glazer | |
| 5,378,254 A | 1/1995 | Maly et al. | |
| 5,401,178 A | 3/1995 | Liu | |
| D357,330 S | 4/1995 | Wong et al. | |
| 5,407,469 A | 4/1995 | Sun | |
| D360,028 S | 7/1995 | Matsuda | |
| 5,435,817 A | 7/1995 | Davis et al. | |
| 5,439,513 A * | 8/1995 | Periasamy et al. | 96/25 |
| 5,454,859 A * | 10/1995 | Chiba et al. | 96/18 |
| 5,474,600 A | 12/1995 | Volodina et al. | |
| 5,492,557 A * | 2/1996 | Vanella | 96/16 |
| 5,494,449 A | 2/1996 | Chioo | |
| D371,192 S | 6/1996 | Putro | |
| 5,547,615 A | 8/1996 | Jane et al. | |
| 5,554,039 A | 9/1996 | Doudon | |
| D374,278 S | 10/1996 | Ganor | |
| D374,713 S | 10/1996 | Ford et al. | |
| 5,578,113 A * | 11/1996 | Glenn | 96/52 |
| D377,213 S | 1/1997 | Wang | |
| 5,601,636 A | 2/1997 | Glucksman | |
| 5,611,967 A | 3/1997 | Jane et al. | |
| 5,613,863 A | 3/1997 | Klaus et al. | |
| 5,616,172 A | 4/1997 | Tuckerman et al. | |
| D379,220 S | 5/1997 | Ellwood | |
| 5,628,641 A | 5/1997 | Hahn | |
| 5,634,806 A | 6/1997 | Hahn | |
| 5,667,563 A * | 9/1997 | Silva, Jr. | 96/50 |
| 5,679,137 A | 10/1997 | Erdman et al. | |
| 5,681,630 A | 10/1997 | Smick et al. | |
| D388,510 S | 12/1997 | Rick et al. | |
| 5,702,507 A * | 12/1997 | Wang | 96/55 |
| D390,940 S | 2/1998 | Chen | |
| 5,713,749 A | 2/1998 | Wu | |
| 5,735,918 A | 4/1998 | Barradas | |
| 5,741,352 A | 4/1998 | Ford et al. | |
| D394,100 S | 5/1998 | Promseeda | |
| D395,146 S | 6/1998 | Miller et al. | |
| 5,762,667 A | 6/1998 | Pippel et al. | |
| 5,769,912 A | 6/1998 | Mansur | |
| 5,772,732 A | 6/1998 | James et al. | |

| | | | | | | |
|---|---|---|---|---|---|---|
| D396,275 S | 7/1998 | Pearson | | D456,070 S | 4/2002 | Garman |
| 5,783,117 A | 7/1998 | Byassee et al. | | 6,364,716 B1 | 4/2002 | Seo |
| 5,791,921 A | 8/1998 | Lee | | D457,230 S | 5/2002 | Huang |
| 5,792,230 A | 8/1998 | Moore et al. | | 6,413,302 B1 | 7/2002 | Harrison et al. |
| 5,800,583 A | 9/1998 | Pippel et al. | | 6,447,587 B1 | 9/2002 | Pillion et al. |
| 5,800,741 A | 9/1998 | Glenn et al. | | 6,454,839 B1 | 9/2002 | Hagglund et al. |
| 5,803,940 A | 9/1998 | Rick et al. | | D464,415 S | 10/2002 | Saunders et al. |
| 5,810,908 A | 9/1998 | Gray et al. | | D465,019 S | 10/2002 | Wu |
| 5,811,004 A | 9/1998 | Robertson | | 6,471,746 B2 | 10/2002 | Hagglund et al. |
| D399,943 S | 10/1998 | Ko | | 6,471,752 B1 | 10/2002 | Lewis |
| 5,819,367 A | 10/1998 | Imamura | | D465,275 S | 11/2002 | Garman |
| D400,661 S | 11/1998 | Ko | | 6,491,734 B1 * | 12/2002 | Park .................. 55/385.3 |
| D400,662 S | 11/1998 | Davis | | D468,820 S | 1/2003 | Smith et al. |
| 5,829,993 A | 11/1998 | Wu | | 6,508,868 B2 | 1/2003 | Pillion et al. |
| 5,837,207 A | 11/1998 | Summers | | 6,508,982 B1 * | 1/2003 | Shoji .................. 422/22 |
| 5,840,092 A | 11/1998 | Rick et al. | | 6,527,829 B1 * | 3/2003 | Malkamaki et al. .......... 95/71 |
| 5,840,094 A | 11/1998 | Osendorf et al. | | 6,540,804 B1 | 4/2003 | Wennerstrom |
| D402,022 S | 12/1998 | Termeer et al. | | 6,544,485 B1 | 4/2003 | Taylor |
| 5,862,737 A | 1/1999 | Chiu et al. | | 6,568,662 B2 | 5/2003 | Schuld |
| 5,879,435 A | 3/1999 | Satyapal et al. | | D476,068 S | 6/2003 | Carey et al. |
| 5,891,399 A | 4/1999 | Owesen | | 6,579,333 B2 | 6/2003 | Huang |
| D409,741 S | 5/1999 | Yuen-Ming | | 6,589,317 B2 | 7/2003 | Zhang et al. |
| 5,906,509 A | 5/1999 | Wu | | 6,616,736 B2 | 9/2003 | Massey et al. |
| D411,001 S | 6/1999 | Pinchuk | | 6,632,407 B1 | 10/2003 | Lau et al. |
| 5,914,453 A | 6/1999 | James et al. | | 6,635,106 B2 | 10/2003 | Katou et al. |
| 5,922,111 A * | 7/1999 | Omi et al. .................. 96/60 | | 6,645,266 B2 | 11/2003 | Huang |
| 5,925,172 A | 7/1999 | Rick et al. | | D485,340 S | 1/2004 | Wu |
| 5,925,320 A | 7/1999 | Jones | | 6,709,297 B2 | 3/2004 | Lee |
| 5,926,614 A | 7/1999 | Steinel | | 6,712,889 B2 | 3/2004 | Pillion et al. |
| 5,945,038 A | 8/1999 | Anderson | | 6,713,026 B2 | 3/2004 | Taylor et al. |
| 5,948,355 A | 9/1999 | Fujishima et al. | | 6,749,654 B2 | 6/2004 | Hilliard |
| 5,957,701 A | 9/1999 | McMillin | | 6,757,150 B2 | 6/2004 | Gorczyca et al. |
| 5,967,807 A | 10/1999 | Wu | | 6,758,884 B2 | 7/2004 | Zhang et al. |
| 5,968,455 A | 10/1999 | Brickley | | 6,768,865 B2 | 7/2004 | Stathakis et al. |
| D416,318 S | 11/1999 | Sato | | 6,790,259 B2 | 9/2004 | Ritri et al. |
| D416,319 S | 11/1999 | Rollins | | 6,862,403 B2 | 3/2005 | Pedrotti et al. |
| D416,613 S | 11/1999 | Bellil et al. | | 6,863,703 B2 | 3/2005 | Pillion et al. |
| 5,986,555 A | 11/1999 | Hamberger et al. | | 6,863,704 B2 | 3/2005 | Pillion et al. |
| 5,997,619 A | 12/1999 | Knuth et al. | | 6,886,814 B1 | 5/2005 | Schuld |
| 6,013,121 A | 1/2000 | Chiu et al. | | 6,896,853 B2 | 5/2005 | Lau et al. |
| 6,017,375 A | 1/2000 | Duell et al. | | 6,897,381 B2 | 5/2005 | He et al. |
| D420,732 S | 2/2000 | Gudefin | | 6,911,186 B2 | 6/2005 | Taylor et al. |
| 6,036,757 A | 3/2000 | Gatchell et al. | | 6,917,754 B2 | 7/2005 | Pedrotti et al. |
| 6,042,400 A | 3/2000 | Queffelec et al. | | 6,926,758 B2 * | 8/2005 | Truce .................. 95/78 |
| 6,045,596 A | 4/2000 | Holland, Jr. et al. | | 6,931,202 B2 | 8/2005 | Pedrotti et al. |
| 6,051,144 A | 4/2000 | Clack et al. | | 6,951,582 B1 | 10/2005 | Tsai et al. |
| 6,053,482 A | 4/2000 | Glenn et al. | | 6,953,556 B2 | 10/2005 | Taylor et al. |
| 6,053,968 A | 4/2000 | Miller | | 6,955,708 B1 | 10/2005 | Julos et al. |
| 6,059,584 A | 5/2000 | Mareno | | 6,958,134 B2 | 10/2005 | Taylor et al. |
| 6,062,880 A | 5/2000 | Skuza | | 6,974,560 B2 | 12/2005 | Taylor |
| 6,062,884 A | 5/2000 | Messimer et al. | | 6,989,051 B2 | 1/2006 | Parisi et al. |
| D426,293 S | 6/2000 | Tounsi et al. | | 7,166,259 B2 | 1/2007 | Beam et al. |
| 6,089,886 A | 7/2000 | Mareno | | 2001/0029728 A1 | 10/2001 | Massey et al. |
| D428,862 S | 8/2000 | Queffelec et al. | | 2001/0045159 A1 | 11/2001 | Johnson et al. |
| D432,222 S | 10/2000 | Rymer et al. | | 2002/0098130 A1 | 7/2002 | Hai Fong |
| 6,126,460 A | 10/2000 | Wu | | 2002/0146356 A1 | 10/2002 | Sinaiko et al. |
| 6,136,074 A * | 10/2000 | Okamoto et al. ............. 96/62 | | 2003/0019362 A1 | 1/2003 | Stiros et al. |
| D433,493 S | 11/2000 | Runyan et al. | | 2004/0065202 A1 | 4/2004 | Gatchell et al. |
| D434,483 S | 11/2000 | Pinchuk | | 2004/0118285 A1 | 6/2004 | Kim et al. |
| 6,163,098 A | 12/2000 | Taylor et al. | | 2004/0129140 A1 | 7/2004 | Park et al. |
| 6,174,342 B1 | 1/2001 | Jeanseau | | 2004/0222315 A1 | 11/2004 | Habatjou |
| 6,176,977 B1 | 1/2001 | Taylor et al. | | 2005/0045037 A1 * | 3/2005 | Parisi et al. .................. 96/66 |
| 6,179,633 B1 | 1/2001 | Inada | | 2005/0109204 A1 | 5/2005 | Coppom et al. |
| 6,183,200 B1 * | 2/2001 | Chang .................. 416/146 R | | 2005/0160907 A1 | 7/2005 | Zhang et al. |
| 6,190,184 B1 | 2/2001 | Cimbal et al. | | 2005/0183576 A1 | 8/2005 | Taylor et al. |
| 6,190,442 B1 | 2/2001 | Redner | | 2005/0223893 A1 | 10/2005 | Hoverson et al. |
| 6,225,907 B1 | 5/2001 | Derryberry et al. | | 2006/0000359 A1 | 1/2006 | Choi et al. |
| 6,239,694 B1 | 5/2001 | Honda et al. | | 2006/0016335 A1 | 1/2006 | Cox et al. |
| D450,377 S | 11/2001 | Terpko et al. | | 2006/0016336 A1 | 1/2006 | Taylor et al. |
| 6,315,821 B1 | 11/2001 | Pillion et al. | | 2006/0016337 A1 | 1/2006 | Taylor et al. |
| 6,328,791 B1 | 12/2001 | Pillion et al. | | 2006/0021503 A1 | 2/2006 | Thaler |
| 6,349,168 B1 | 2/2002 | Jaworski | | 2006/0032199 A1 | 2/2006 | Beam et al. |
| 6,355,095 B1 * | 3/2002 | Kuo-Long .................. 96/26 | | 2006/0045036 A1 | 3/2006 | Isobe et al. |

| | | | | | | |
|---|---|---|---|---|---|---|
| 2006/0053758 A1 | 3/2006 | Wu et al. | | JP | 60-174439 | 9/1985 |
| 2006/0075729 A1 | 4/2006 | He et al. | | JP | 61-163351 | 7/1986 |
| 2006/0130657 A1 | 6/2006 | Bohlen et al. | | JP | 62-68513 | 3/1987 |
| 2006/0288871 A1* | 12/2006 | Crapser et al. ............... 96/52 | | JP | 63-258615 | 4/1987 |
| | | | | JP | 62110754 A | 5/1987 |
| | | | | JP | 63-137718 | 6/1988 |

FOREIGN PATENT DOCUMENTS

| | | | | | |
|---|---|---|---|---|---|
| DE | 3623731 A1 | 1/1988 | JP | 63-205114 | 8/1988 |
| DE | 100 27 428 A1 | 12/2001 | JP | 3-254808 | 11/1991 |
| EP | 0 267 697 A2 | 5/1988 | JP | 03270705 | 12/1991 |
| EP | 0 693 659 A2 | 1/1996 | JP | 03270705 A | 12/1991 |
| EP | 1245289 A2 | 10/2002 | JP | 4-149885 | 5/1992 |
| EP | 1447629 A | 8/2004 | JP | 6-39226 | 2/1994 |
| EP | 1 433 515 A2 | 12/2004 | JP | 08034229 | 2/1996 |
| EP | 1 547 693 A1 | 6/2005 | JP | 08034229 A | 2/1996 |
| EP | 1 219 309 B1 | 8/2005 | JP | 8-131742 | 5/1996 |
| EP | 1 327 110 B1 | 11/2005 | JP | 11-76726 | 3/1999 |
| EP | 1 600 201 A1 | 11/2005 | WO | WO 96/11745 | 4/1996 |
| EP | 1 025 895 | 12/2005 | WO | WO 96/11745 A | 4/1996 |
| EP | 1 629 897 | 3/2006 | WO | WO 97 19710 | 6/1997 |
| EP | 1 659 665 | 5/2006 | WO | WO 97/47928 A2 | 12/1997 |
| EP | 1 705 765 | 9/2006 | WO | WO 97/47928 A3 | 12/1997 |
| EP | 1 726 351 | 11/2006 | WO | WO 98/29695 | 7/1998 |
| FR | 2 240 021 | 3/1975 | WO | WO 99/03158 A1 | 1/1999 |
| GB | 2088250 A | 11/1980 | WO | WO 2005/039659 | 6/2005 |
| GB | 2088250 A | 6/1982 | WO | WO 2005 088794 | 9/2005 |
| GB | 2 405 463 | 3/2005 | WO | WO 2006 085439 | 1/2006 |
| JP | 46-599 | 1/1971 | WO | WO 2006/023796 | 3/2006 |
| JP | 53-130578 | 11/1978 | WO | WO 2006/051267 | 5/2006 |
| JP | 54-162660 | 7/1979 | WO | WO 2007 010894 A1 | 1/2007 |
| JP | 58-166948 | 10/1983 | | | |
| JP | 6210754 | 5/1985 | * cited by examiner | | |

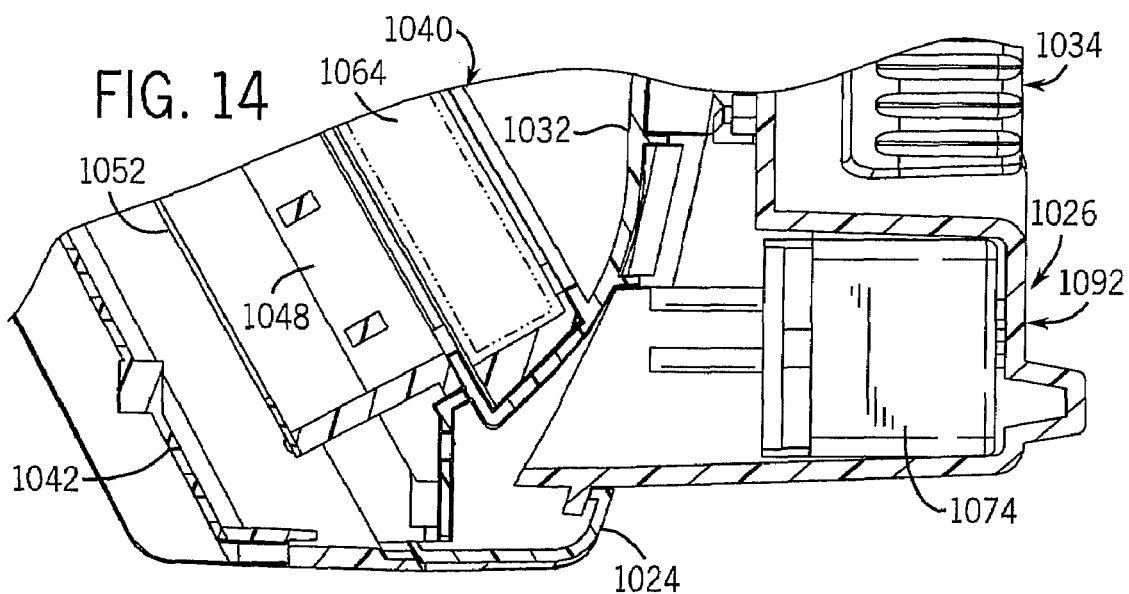
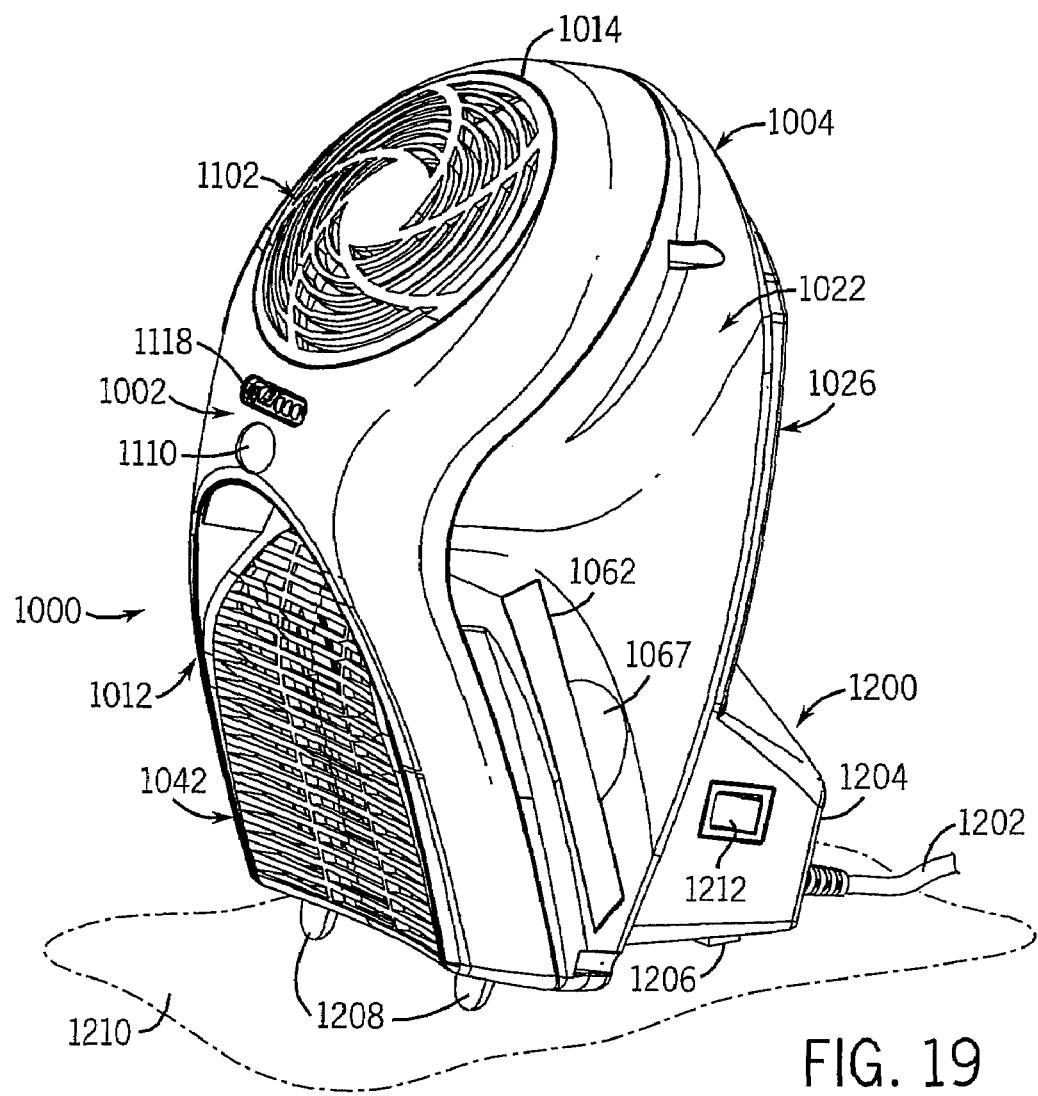

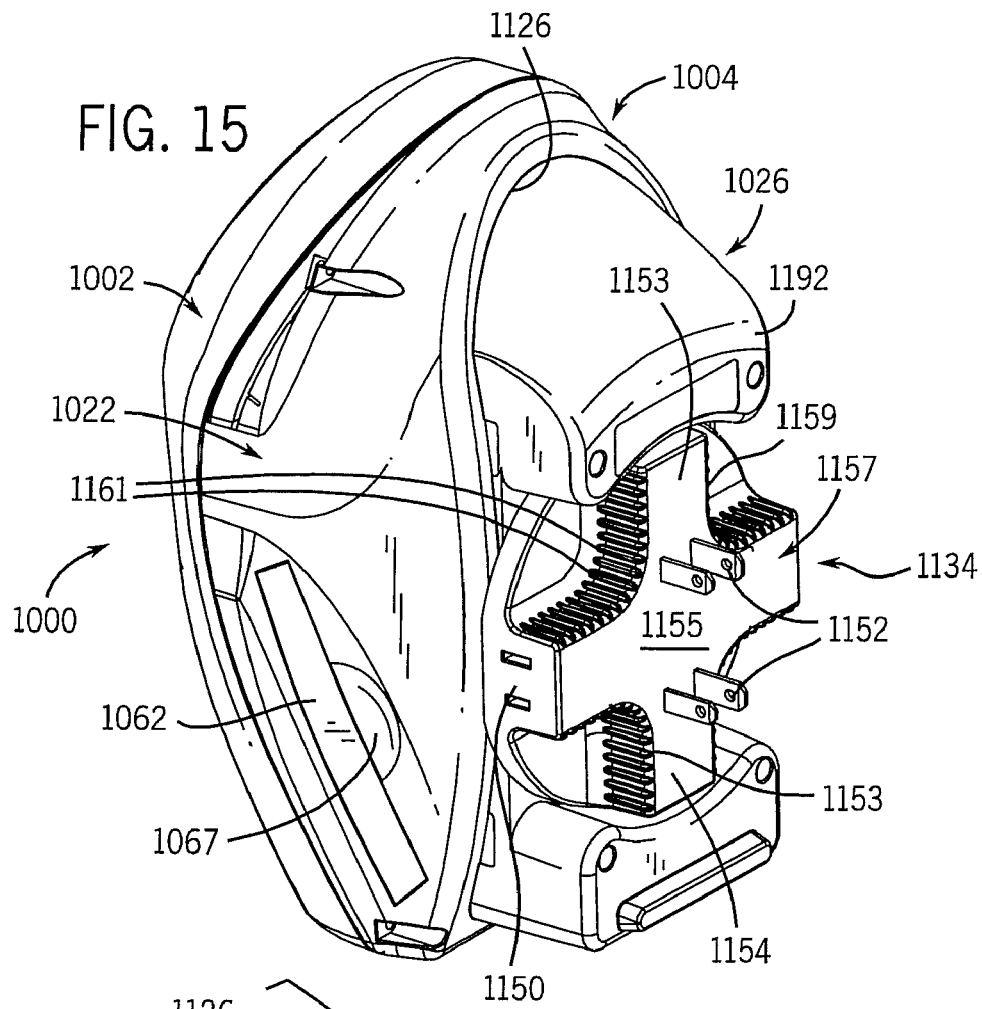
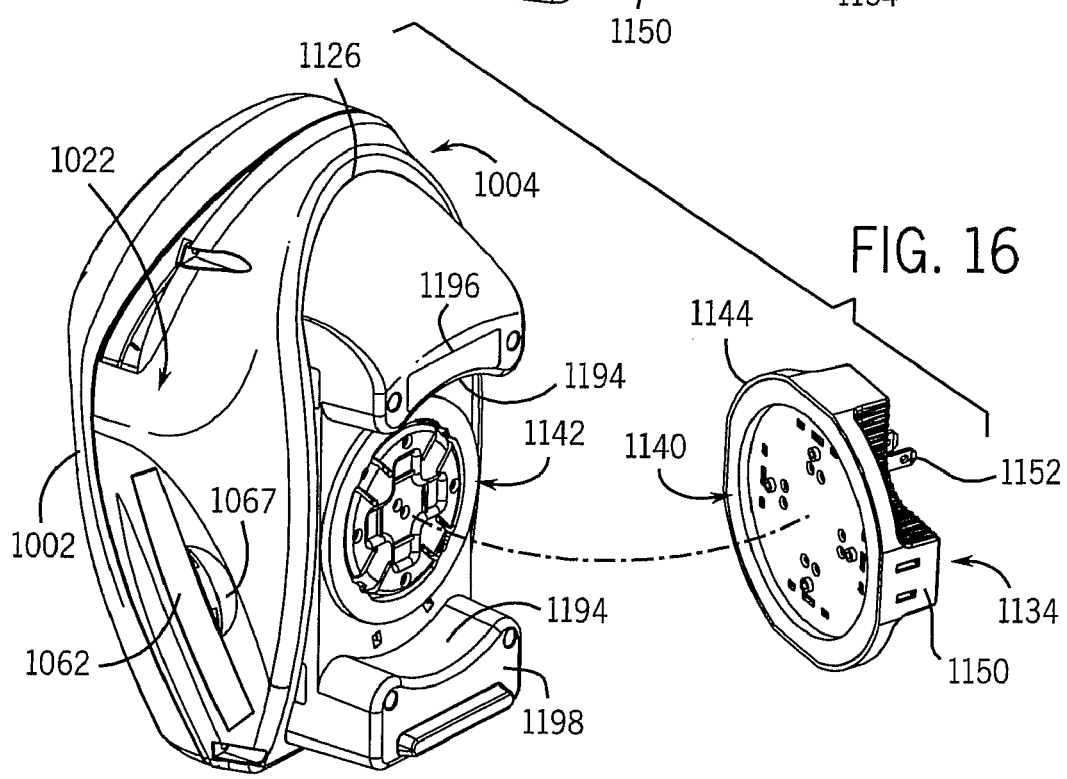

AIR PURIFIER

CROSS-REFERENCE TO RELATED APPLICATIONS

This application claims priority from Provisional U.S. Patent Application Ser. No. 60/707,350, filed on Aug. 11, 2005, and Provisional U.S. Patent Application Ser. No. 60/707,076, filed on Aug. 10, 2005, each of which are incorporated herein by reference in their entirety.

BACKGROUND OF THE INVENTION

1. Field of the Invention

The present invention relates to air-cleaning devices. In particular, this invention relates to air-cleaning devices that provide air purification using an ionizer and an ion precipitator that are positionable on a surface or supportable by a conventional wall electrical outlet.

2. Discussion of the Related Art

The increase of outdoor air pollution over many years has created a greater awareness for the type of damage that outdoor air pollution can cause to one's health. What is not commonly known, however, is that indoor air pollution also exists and can have a significant effect on one's health. There have been recent Environmental Protection Agency studies that indicate that indoor air pollution levels have the potential to be 2-5 times higher than outdoor air pollution levels. It is estimated by some that, on rare occasions, indoor air pollution levels can be 100 times higher than outdoor air pollution levels. This is an increasingly important matter that must be addressed, as some people spend 90% of their time indoors, especially infants and the elderly. Some of these indoor pollutants may also be contributing factors to frequent and unexplained headaches or sleepless nights that afflict numerous persons within the general population.

There have been numerous prior art devices designed and manufactured for purifying air. With more homes and offices becoming better insulated, an objective of air purifiers is to clear the indoor air of common pollutants, including dust, smoke, pollen, bacteria, soot, mold spores, animal dander and other microscopic irritants, and thereby create a clean, healthy, fresh, and pleasant environment. Some of these apparatuses generate ions by using complicated wire grid arrays or with high voltage electrode arrays. Some use fans for moving air and similar complicated apparatuses. Some of these prior art devices are mounted in large housings that contain fans and other complicated moving parts and filters. Often, they become clogged with pollutants, requiring disassembly of fan assemblies, replacement and/or repair of high-voltage generating sources, extensive clearing of arrays of wires and electrodes that help create air movement, and replacement of filters that clog the apparatuses unless cleaned. These devices are certainly more complicated and perhaps more expensive than what some users may anticipate or desire.

Furthermore, air-cleaning devices were initially used in bathrooms and kitchens and, consequently, have tended to be more functional than attractive. Air-cleaning devices are now used in bedrooms and living rooms, and consumers who wish to use air fresheners in these areas of the home may be reluctant to place an unattractive, functional container in these areas.

For years, ozone has been used to treat and sanitize water supplies, sanitize pools and spas and remove odors in hotels and fire-damaged buildings. More recently ozone generators have been sold as a way to "clean" the air in a home. Ozone is a molecule formed of three atoms of oxygen. As an unstable molecule, ozone readily offers one of the oxygen atoms to other substances it encounters. When ozone encounters another substance, it shares an oxygen atom, chemically altering that substance. The chemical alteration of microorganisms, mold, mildew, fungi, and bacteria generally results in the death of those substances and the elimination of its odor.

However, manufacturers of ozone generators and public health agencies are engaged in debate over the use of ozone in the home. Public health agencies claim that ozone is potentially dangerous to human health and recommend that the generators not be used, as ozone may be a respiratory irritant. The same chemical properties that allow ozone to react with organic material in the air also allow it to react with similar organic material inside the human body, particularly in the respiratory system. While most people can stand limited exposure, symptoms like mouth and throat dryness, coughing, headache, eye irritation, and chest restriction may occur in some individuals at the concentrations produced by residential ozone generators.

Moreover, consumers generally do not want a "one size fits all" air-cleaning device. Consumers prefer an air-cleaning device that can be customized to meet their specific needs. Consequently, to overcome the limitations of air-cleaning devices that are currently available on the market and to address a wide range of consumer needs. Therefore, what is needed is a way of providing an effective air purification device that includes an ozone-reducing mechanism and a way of reconfiguring the device to meet a specific consumer's needs.

Additionally, most prior art air-cleaning devices are designed to be placed directly on a supporting surface, such as a floor, a table or shelf, such that the size of the components of the device was not a cause for design concerns as the devices were designed to have large housings easily supported by these surfaces. However, in many situations it is desirable to have an air-cleaning device with a compact housing that does not take up significant space on a supporting surface, which can then be used for other items. Further, it is even more desirable to have the air cleaner supported by a wall or other vertical surface, such that the air cleaner has no footprint on a horizontal supporting surface, while still providing effective air cleaning to a room in which the air cleaner is located.

SUMMARY OF THE INVENTION

According to a first aspect of the present invention, an air purifier is provided in which air is passed through the purifier from an air inlet to an air outlet. Air from the environment to be purified is drawn into the inlet of the device by a fan which can be located within the device at almost any point along the flow path for the device. The air entering the device through the inlet passes an upstream ionizer that effectively charges the particulates in the air stream by emitting ions that attach to the particulates flowing past the ionizer. The ionized particles are then entrapped by a filter element disposed downstream of the ionizer that is manufactured to have a charge opposite to that of the ions generated by the ionizer. Due to the attraction between the charged particles and the oppositely charged filter, the charged particulates are entrapped within the filter and removed from the air, which passes through the filter and out of the device. The ionizer is configured with an ionizing needle from which the ions that adhere to the particulates are generated, and a ground plate spaced from the ionizing needle. The ground plate functions to restrict the dispersion of ions from the ionizing needle in a manner which focuses the dispersion of ions from the ionizing needle along the flow path for the air through the device. In other words, the ions generated by the ionizing needle are essentially contained within the device, and cannot create an ionized cloud outside of the device capable of generating sufficient static electricity to cause an electrostatic discharge and shock an individual near the device. Further, the ionizing needle is shaped to have as sharp a profile as possible in order to maximize the ion generation from the point of the ionizing needle or pin, in order to maximize the flow of ions through the device. This configuration for the ionizing pin also assists the ground plate in directing the ions through the device.

According to another aspect of the present invention, the device may include a downstream ionizer, in addition to, or without the upstream ionizer. The downstream ionizer is positioned adjacent the outlet end of the device and is constructed similarly to the upstream ionizer with an ionizing pin and a ground plate. The pin can be oriented to point oppositely to or in the same direction as the air flow path through the device, and functions to charge the particulates in the air passing the pin. The ground plate operates to ensure that the ions formed by the pin are contained within the device to substantially reduce any electrostatic discharge problems. However, because the downstream ionizer is located downstream from the filter, the particles charged by the ions from the ionizer pin are directed out of the outlet for the device by the fan. Due to their charged state, these particles are attracted to various oppositely charged surfaces in the room, such as tables, floors, etc., where the particulates come to rest. The particulates can then be cleaned from these surfaces.

According to still another aspect of the present invention, the device includes a housing for the charged filter element that acts as a lockout feature for the device in order to insure that the filter and housing are positioned within the device prior to activation of the device. By insuring that the oppositely charged filter is located within the flow path through the device prior to activation of the upstream ionizer, the ions generated by the upstream ionizer are effectively maintained within the device as the majority of the ions are entrapped by the oppositely-charged filter, maintaining the ions within the device to avoid any electrostatic discharge outside of the device.

According to still a further aspect of the present invention, the device can include one or more of a number of different filter use-up cues capable of determining the amount of particulate matter collected by the filter when the device is in operation and for providing an indication to an individual that the filter needs to be cleaned or replaced.

According to still another aspect of the present invention, the air flow path through the device is designed to create a substantially laminar flow for the air drawn into the device and increase the efficiency of the device. This is achieved by the configuration of the interior flow pathway within the device, in order to create the desired angles for air flow into and out of the device. This substantially laminar flow is accomplished by the structure of the housing of the device and optionally a baffle positioned within the housing, which functions to draw air to be cleaned into and direct the air out of the device at an angle of approximately 45°, in conjunction with the baffle or baffles positioned within the device.

According to still another aspect of the present invention, the housing includes, as a connection to a suitable power supply, a plug deck assembly spaced from the air flow chamber of the device that can support the device from a conventional electrical wall outlet as well as supply power to the device. The plug deck assembly includes a pair of plugs engageable with the outlet and located in a housing rotatably secured to the device to position the device vertically from horizontal or vertical wall outlets. The housing also includes a number of outlets to provide the ability to supply power to devices other than the air purifier from the outlet on which the air purifier is supported.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 14 is a partially broken away, isometric view of the lower portion of the air purifier of FIG. 13;

FIG. 15 is a rear isometric view of the air purifier and plug deck assembly of FIG. 9;

FIG. 16 is a partially exploded, isometric view of the air purifier and plug deck assembly of FIG. 15;

FIG. 19 is an isometric view of a third embodiment of the air purifier constructed according to the present invention.

Figure 1:
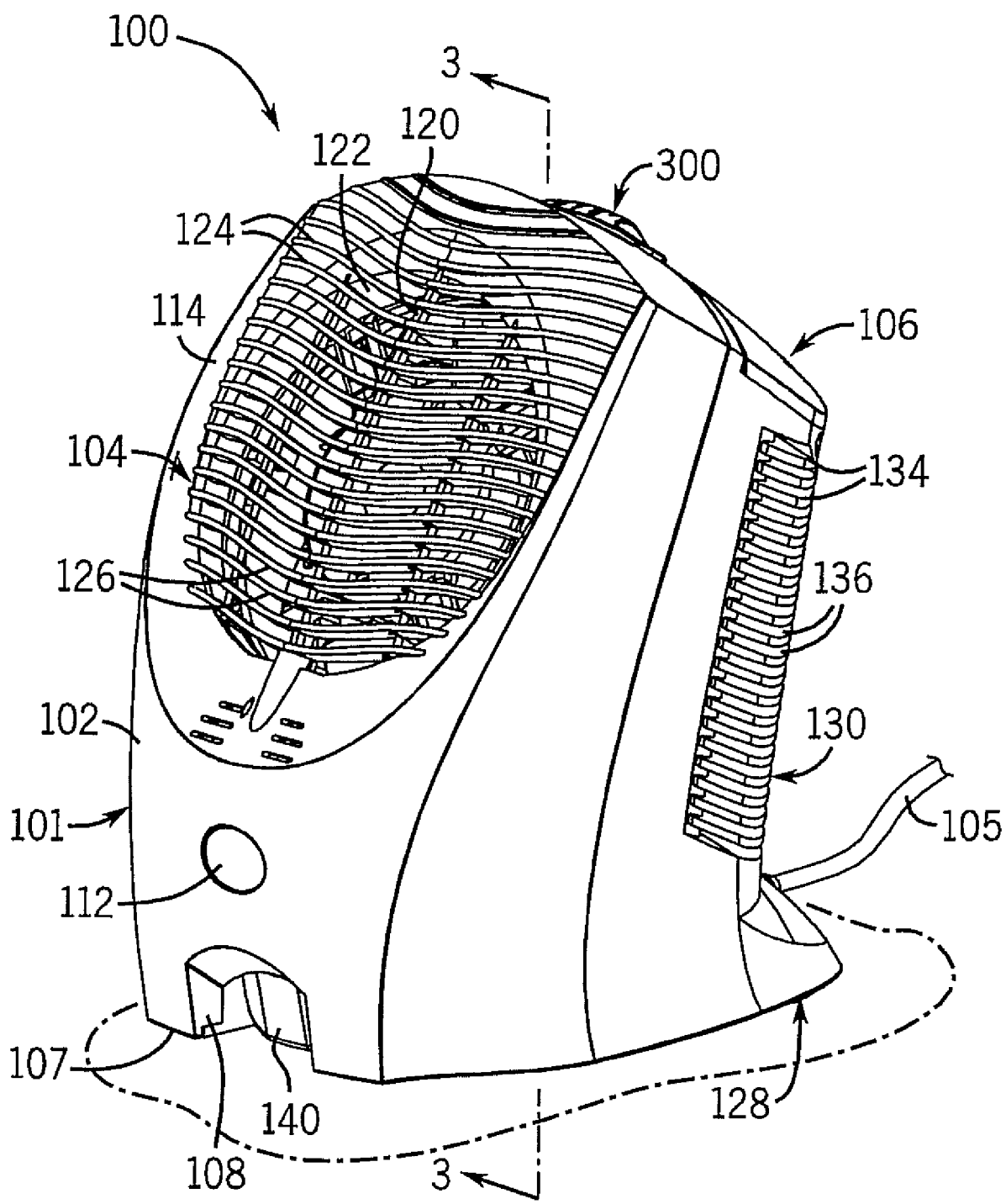
FIG. 1 is an isometric view of a first embodiment of an air purifier constructed according to the present invention.

In describing the preferred embodiment of the invention that is illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the word connected, attached, or terms similar thereto are often used. They are not limited to direct connection but include connection through other elements where such connection is recognized as being equivalent by those skilled in the art.

DETAILED DESCRIPTION OF THE INVENTION

The present invention and the various features and advantageous details thereof are explained more fully with reference to the non-limiting embodiments described in detail in the following description.

An air purifier device constructed according to the present invention is indicated generally at 100 in FIGS. 1-4. The device 100 has an exterior 101 including a front housing 102 incorporating a cover 104, and a rear housing 106, each formed of a suitable rigid material, and preferably a non-conductive material, such as a plastic material. The device 100 includes a plug 105 that can be connected to a suitable power supply (not shown) to enable operation of the device 100. Other power supplies can also be utilized, such as an internal battery (not shown) that may be rechargeable. The front housing 102, generally opposite the cover 104 at lower end 107 thereof, includes a recess 108 allowing for access to a volatile housing 110, best shown in FIG. 4. Further, between the cover 104 and recess 108, the front housing 102 includes an indicator light 112 which can take the form of a light pipe, or any other suitable type of light, such as an LED light.

The front housing 102 defines, opposite the recess 108, an aperture 114 within which the cover 104 is positioned. The aperture 114 functions as an exhaust port for the device 100 such that air drawn into the device 100 for purification is expelled though the aperture 114 back into the room after being purified within the device 100. The front housing 102 also includes a number of sleeves 116 that extend rearwardly from the front housing 102 and are used to secure the front housing 102 to the rear housing 106 with accompanying fasteners (not shown).

The cover 104 has a shape complimentary to the shape of the aperture 114 in the front housing 102 and includes a base 118 engagable within the aperture 114, and a central support 120 extending across an opening 122 formed within the base 118. A number of vanes or louvers 124 extend from the base 118 across the opening 122 and the central support 120 in order to divide the exposed surface of the cover 104 to a number of specific airflow slots 126 through which the air exiting the device 100 may flow. The shape and number of the aperture 114 and vanes 124 can be varied as desired, and the vanes 124 can be constructed to be adjustable in order to allow an individual to direct the output air flow of the device 100 where desired. In addition, the cover 104 and each of its component parts can be formed as an integral part of the front cover 102.

The rear housing 106 is illustrated as including a support base 128 forming a footprint for the device 100. The base 128 supports a frame 130 extending upwardly from the base 128 and defining an opening 132 across which extend a number of vanes or louvers 134 to define a number of airflow inlet slots 136 therebetween. In a particularly preferred embodiment, the frame 130, which can be varied in shape as desired, extends upwardly from the base 128 at an angle with respect to the base 128 that is designed to optimize the purification and/or cleaning of air flowing through the device 100. Preferably this angle is between twenty (20°) and fifty (50°) degrees for the device 100. Similarly to the cover 104 on the front housing 102, the shape and numbers of the opening 132 and vanes 134 can be varied as desired and the vanes 134 can be formed to be adjustable with respect to the rear housing 106. The base 128 also includes a number of sleeves 138 that are aligned with the sleeves 116 on the front housing 102 to secure the rear housing 106 to the front housing 102 using suitable fasteners. However, any other suitable means of attaching the front housing 102 and the rear housing 106 to one another can be used, such as a suitable adhesive, or thermal or sonic welding of the front housing 102 and the rear housing 106 to one another.

Between the front housing 102 and the rear housing 106 is disposed the volatile housing 110 which includes a frame 142 on which are disposed a number of securing channels 144 alignable with the sleeves 138 of the rear housing 106 to affix the volatile housing 110 to the rear housing 106. Additionally, the volatile housing 110 includes a biasing mechanism 146 connected to the frame 142 at one end and having a handle 148 at the opposite end to define a space 149 between the frame 142 and the mechanism 146. The mechanism 146 is deflected upon the insertion of a volatile container 140 into the housing 110 and, due to inherent bias of the mechanism 146, secures and engages the container therein. When held in the housing 110, the volatile container 140 can release controlled amounts of the volatile, such as by the use of a suitable dispensing mechanism or valve (not shown), into the air flow passing the housing 110 to scent the purified air. The handle 148 can, subsequently, be operated in order to release the mechanism 146 and allow the volatile container 140 to be removed from the housing 110 for replacement. The housing 110 can also be modified to enable volatile containers 140 holding different forms of volatiles, such as liquids, gels, solids, etc., to be held within the housing 110. Also, the housing 110 can be moved or adjusted in position to other locations within the device 100 in order to enable the housing 110 and container 140 held in the housing 110 to dispense the volatile into the air flow through the device 100 where desired. Further, the housing 110 can incorporate a lighting element (not shown) that is positioned on the housing 110 directly behind the volatile container in order to function as a night light.

Figure 2:
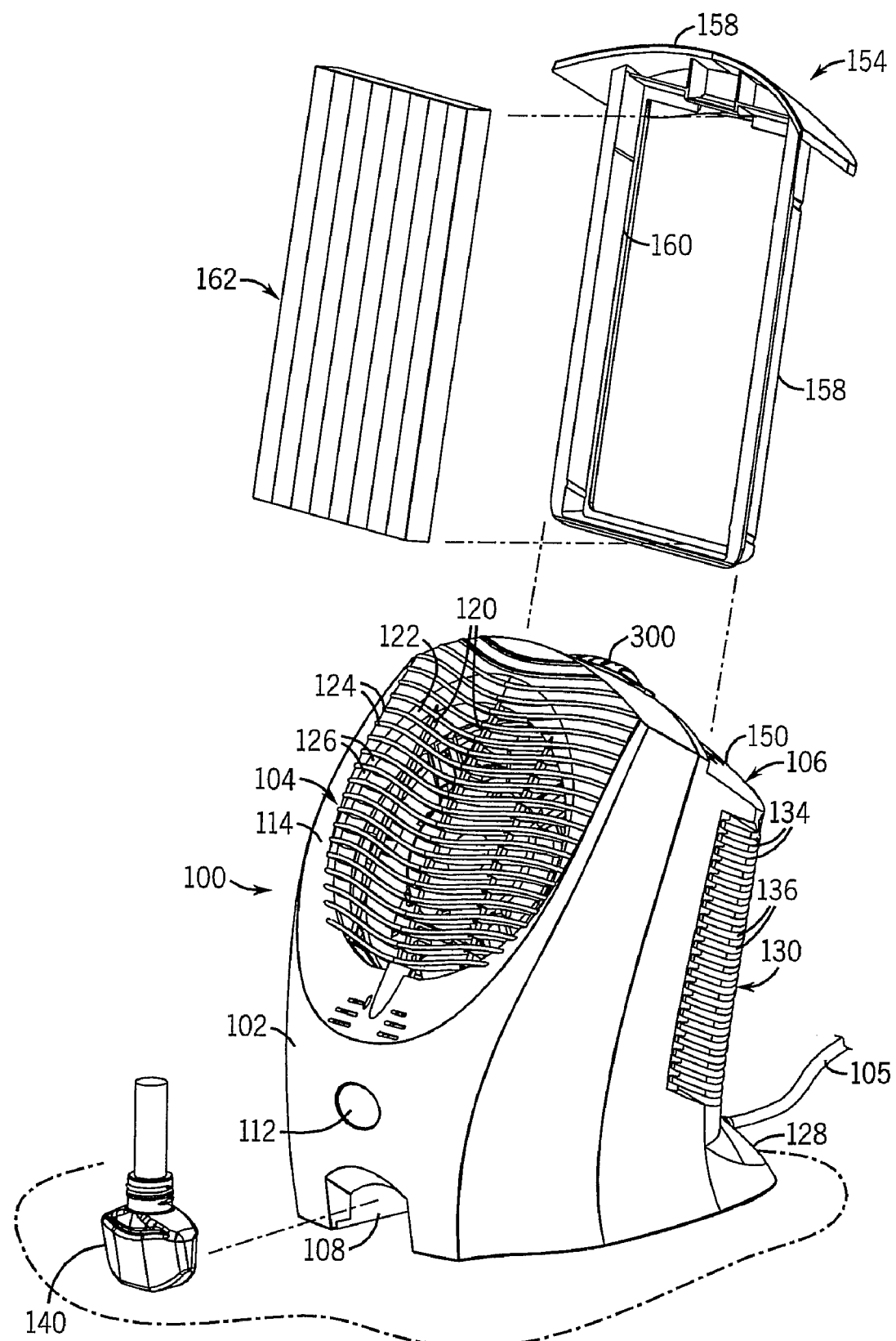
FIG. 2 is a partially exploded, isometric view of the air purifier of FIG. 1.

Opposite the supporting base 128, a top end 150 of the rear housing 106 includes an opening 152 therein. The opening 152 is capable of releasably receiving a filter tray 154 therein, which is best shown in FIGS. 2 and 4. The filter tray 154 includes a generally rectangular holding frame 156 and a handle 158 attached to one end of the frame 156. When the tray 154 is fully inserted within the opening 152, the handle 158 conforms generally to the shape of the top end 150 to provide an aesthetically pleasing appearance to the device 100. The frame 156 includes a retaining member 160 therein, preferably formed as an inwardly extending peripheral flange, in order to hold a high airflow filter 162 within the tray 154. The filter 162 includes an electric charge in order for the filter 162 to function properly in conjunction with the one or more ionizing assemblies 170 and 500 disposed within the device 100. Preferably, the tray 154 is engageable with a suitable lockout mechanism 164, best shown in FIGS. 3-5, located within the device 100. In order for the device 100 to be operated, the filter tray 154 and filter 162 must be fully inserted within the housing 106 to disengage the lockout mechanism 164 and allow for the operation of the device 100. In a preferred embodiment, the lockout mechanism 164 can include a housing 166 that is positioned within the device 100 in alignment with and generally opposite the opening 152 and that is operably connected to the power supply used to operate the device 100. The mechanism 164 also includes a number of resilient contacts 168 extending outwardly from the housing 166. When the tray 162 is inserted into the opening 152, the tray 162 engages and deflects the contacts 168, completing a power circuit (not shown) in the device 100, enabling the device 100 to be operated. If the tray 162 is not in the fully inserted position within the device 100, the tray 162 will not engage the contacts 168 to complete the power circuit, and the device 100 will not operate.

The filter 162 can be permanently engaged with the tray 154, so that when the filter 162 becomes dirty the entire tray 154 must be replaced, or the filter 162 can be removably secured to the tray 154, such that only the filter 162 need be replaced. The filter tray 154 can also include various means to prevent the improper placement of the filter 162 in the tray 154, such as a bar (not shown) positioned along one side of the tray 154 and matable with a groove (not shown) in one side of the filter 162, or a recessed or expanded corner of the tray 154 that accommodates a cut off or extended portion (not shown) of the filter 162. Additionally, the tray 154 may include a structure (not shown) to include the volatile container 140 as a part of the tray 154, such that the volatile container 140 can be replaced as one piece with the tray 154. However, regardless of the particular configuration, the volatile container 140 is disposed downstream from the filter 162, or the volatile dispensed from the container 140 is dispensed into the air flow after the air has passed through the filter 162, such that the volatile is not removed from the air flow by the filter 162.

The device 100 can also include one of a number of suitable use-up cues (not shown) that can illustrate to an individual when the filter 162 needs to be replaced. Examples of the different types of filter use-up cues that may be utilized include timers with reset switches that determine the length of time a particular filter element 162 has been in use in the device 100 based upon the time intervals between separate disengagements or removals of the tray 154 from the device 100, photoeyes that sense the amount of particulate matter collected on the filter 162, air flow or air speed meters for sensing the air flow through the filter 162, and mechanical obstructions positioned on or adjacent the filter 162, among others. In addition, any of these use-up cues can be operably connected to an audible or visible display (not shown) disposed on the device 100 in order to provide audible and/or visible indications that the filter 162 requires changing.

The angle of the frame 130 on the rear housing 104 with respect to the base 128 defines an air flow path through the device 100 that is essentially horizontal at the intake end in the rear housing 106, and that slopes upwardly at an angle of between twenty (20°) and fifty (50°) degrees as the path moves through and exits the device at the outlet end in the front housing 102. In a particularly preferred embodiment, the angle between the base 128 and the frame 130 is forty-five degrees (45°). This angle of the air flow path enables the purified air exiting the device 100 through the aperture 114 in the front housing 102 to be dispensed from the device 100 at a level, or in a direction above the level of air that is being drawn into the device 100 through the opening 132 on the rear housing 102. Thus, the purified air is dispensed from the device 100 in a manner that prevents that purified air from being immediately drawn back into the device 100, enabling the purified air to circulate much more substantially throughout the room, while enabling additional amounts of non-purified air to be drawn into the device 100. In addition, the angle of the air flow path through the device 100 allows the air flow through the device 100 to be substantially laminar. The substantial reduction in turbulence in the air flow through the device 100 allows the air to be purified more efficiently by the filter 162 and the ionizing assembly 170, to be described.

Referring now to FIGS. 3-6, the ionizing assembly 170 is illustrated that generates electrons/ions for attachment to particles dispersed throughout the air flow, in order to charge these particles and enable the particles to be attracted to, and removed from the air flow by the filter 162, in a known manner. The assembly includes in the preferred embodiment a generally rectangular ionizer frame 176 that is formed of a non-conductive material, such as a plastic material, and is positioned within the device 100 within the rear housing 106 adjacent the opening 132 on the frame 130. The ionizer frame 176 has a top end 178 conforming to the shape of and positioned within a portion of the opening 152 in the top end 150 of the frame 130, and a bottom end 180 engageable with the support base 128. The frame 176 defines a generally rectangular opening 182 between the top end 178 and bottom end 180 through which air flowing into the device 100 from the opening 132 may flow, though other shapes for the opening 182 can be utilized as well. On one side of the opening 182, the frame 176 includes a U-shaped peripheral wall 175 that extends from one side of the top end 178 around the frame 176 to the opposite side of the top end 178. The wall 175 and the bottom end 180 define therebetween a channel 177 that is aligned with the portion of the opening 182 unobstructed by the top end 178 and that is dimensioned to slidably receive the tray 154 therein. A pair of securing flanges 179 extends outwardly from each side of the wall 175 that are additionally connected to the wall 175 by a number of braces 181. A number of retaining members 183 that serve to engage and retain the frame 176 on a suitable structure (not shown) disposed within the rear housing 102 are disposed on each of the flanges 179 and on the bottom end 180 opposite the opening 172. Also, a chamber 185 is disposed in one corner of the frame 176 adjacent the bottom end 180 that receives the lockout mechanism 164 therein in order to properly position the mechanism 164 with respect to the tray 154.

Figure 6:
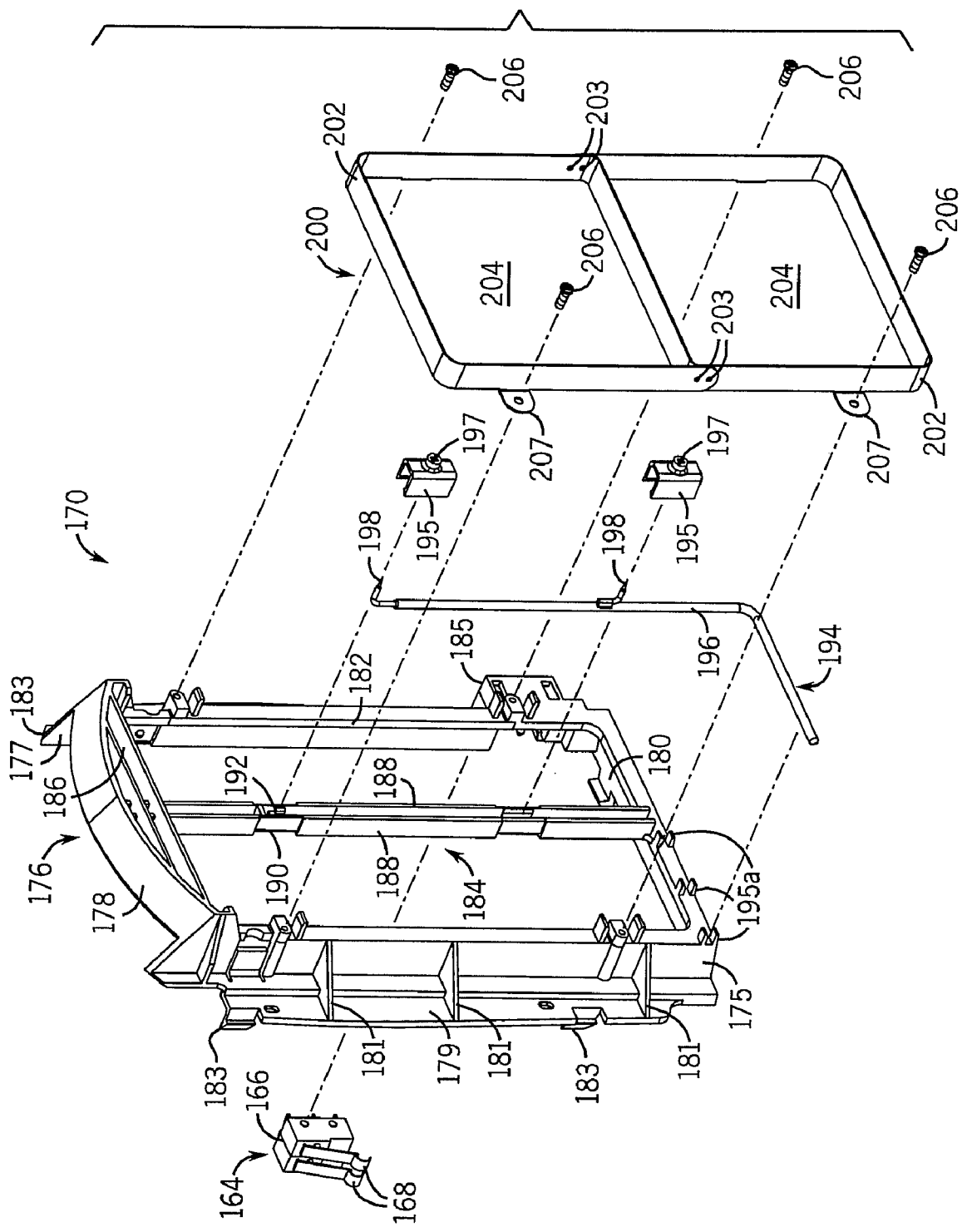
FIG. 6 is an exploded view of the ionizing assembly of FIG. 5.

The opening 182 is crossed by an ionizer support 184 that extends across the opening 182 from the bottom end 180 to a brace 186 positioned immediately below the top end 178, and is preferably formed integrally with the frame 176. The support 184 is generally U-shaped, including a pair of side walls 188 extending perpendicularly from opposite sides of a center wall 190. The support 184 includes a pair of securing members 192 disposed within the support 184 between the side walls 188 to which an ionizer pin assembly 194 can be secured. The assembly 194 is formed from an electrically conductive metal, such as copper or brass, and includes a base member 196 positionable within the ionizer support 184, and a pair of ionizing pins 198 connected to and extending outwardly from the base member 196. One preferred configuration for the ionizing pin assembly 194 is shown in FIG. 6, but other embodiments are also contemplated in which additional pins 198 are provided on the base member 196. The pins 198 can be integrally formed with the base 196 or secured thereto, such as by soldering, and extend outwardly from the support 184, preferably in an upstream direction toward the opening 132 in the rear frame 106. The pins 198 are covered and held in position within the support 184 by clips 195 secured to the support 184 over each of the pins 198. The clips 195 each include an opening 197 through which the tip of the adjacent pin 198 can extend, while the clip 195 engages and holds the remainder of the pin 198 and the portion of the base member 196 immediately adjacent the pin 198 within the support 184. The portion of the base member 196 extending outwardly from the support 184 for connection to the power supply can be secured to the frame 176 by clips 195a formed directly on the frame 176. The assembly 194, after being secured within the support 184, is electrically connected to an electrical power source for the device 100 via the base member 196 in order to supply the necessary voltage (i.e., between 2-20 kV, preferably between 2-10 kV and most preferably between 2-5 kV) to the pins 198 for ion generation. The pins 198 are shaped to be as sharp as possible in order to maximize the emission of electrons or ions from each of the pins 198. To reduce voltage leakage from the assembly 194, the entire assembly 194 is electrically isolated from both the ionizer support 184 and the ionizer frame 176 in order to maximize the ion production from the assembly 194. This is accomplished in a preferred embodiment by making the assembly 194 as small as possible to minimize the number of necessary connections between the assembly 194 and the frame 176, i.e., only via the clips 195 and 195a, and by forming the frame 176 out of an electrically non-conductive material.

Figure 4:
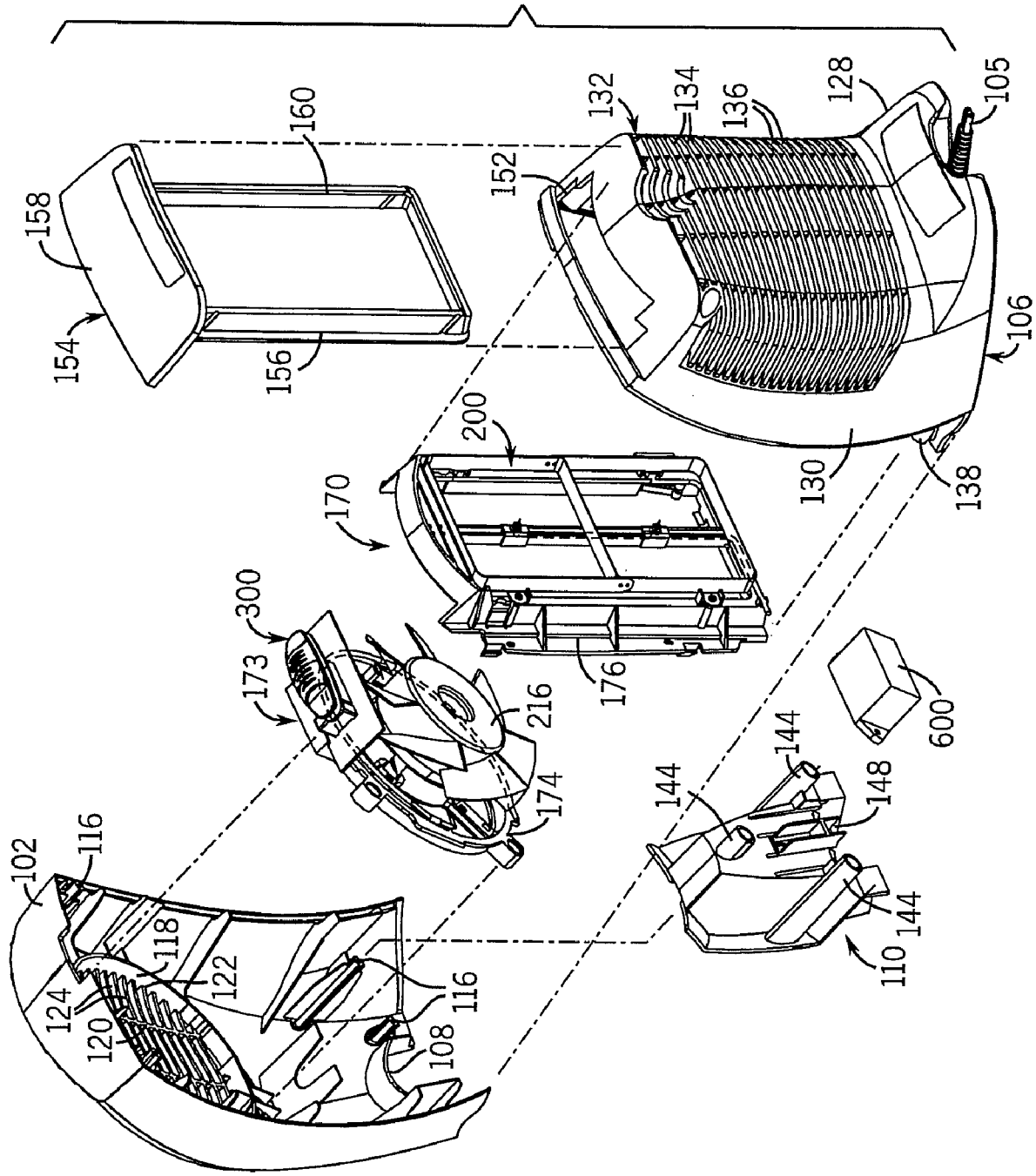
FIG. 4 is an exploded, isometric rear view of the air purifier of FIG. 1.
Figure 5:
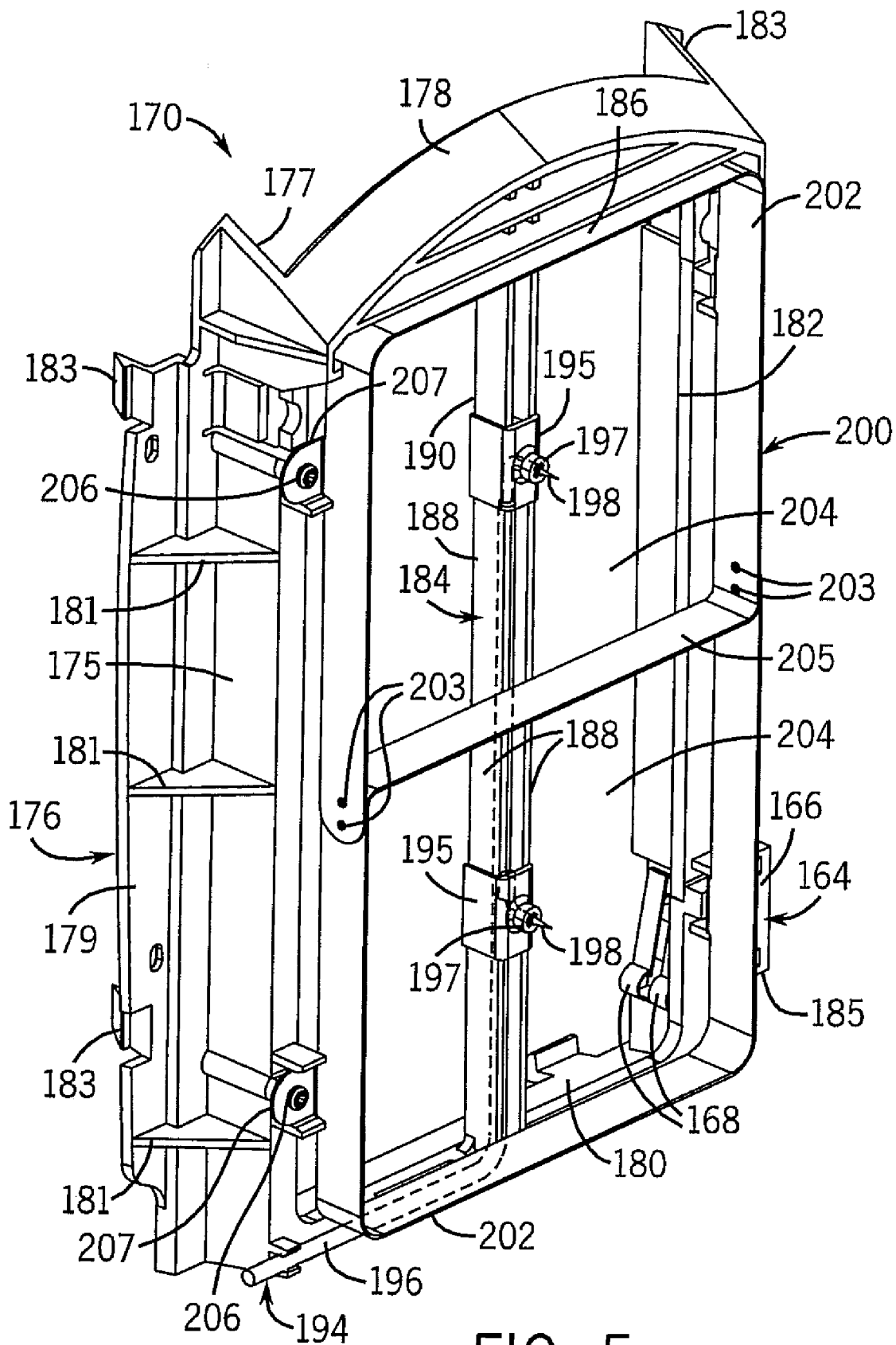
FIG. 5 is an isometric view of an upstream ionizing assembly of the air purifier of FIG. 1.

In order to maximize the effectiveness of the ions generated by the pins 198 on the assembly 194, the ionizer frame 176 also includes a ground plate 200, illustrated best in FIGS. 4-6, that is disposed in the ionizer frame 176 upstream from the pin assembly 194. The ground plate 200 includes a pair of generally square sections 202 secured to one another using suitable fasteners (not shown) inserted through aligned openings 203 in opposed ends of each section 202 to form a plate 200 with a generally rectangular perimeter. The plate 200 is divided to form two generally square apertures 204 therein by a cross-member 205 extending across the plate 200 generally parallel to the upper and lower ends of the plate 200. In the alternative, the plate 200 could be formed from a single, unitary piece of conductive material. The shape of the apertures 204 is formed to conform to the positioning of the pins 198 in the ionizer assembly 194, such that the axis of each of the pins 198 extends approximately through the center of each aperture 204. The ground plate 200 is secured to the ionizer frame 176 around the periphery of the opening 182 by tabs 207 integrally formed with and extending outwardly from each section 202 that are aligned with and secured to complementary components on the frame 176 using any suitable fasteners 206 or other connecting means. The position of the plate 200 around and upstream of the pins 198 operates to prevent the charged electrons/ions generated by the pins 198 from passing through the aperture 114 and out of the device 100 past the ground plate 200. This ensures that the electrons/ions generated by the pins 198 flow through the device 100 towards the filter 162 instead of outwardly from the front housing 102 of the device 100, because the ground plate 200 operates to restrain the electrons/ions from exiting the device 100. This, in turn, prevents the electrons/ions from forming a cloud outside of the intake for the device 100, which creates a charge build-up and a potential for electrostatic discharge by an individual near the intake. The ground plate 200 is also mounted to the ionizer frame 176 using the tabs 207 in a manner that electrically isolates the ground plate 200 from the frame in order to maximize the direction of the electrons/ions from the pins 198 through the frame 176. The ground plate 200, and the respective sections 202 forming the ground plate 200, are formed to be as thin as possible in order to enable the plate 202 to be more easily electrically isolated by simply attaching each of the sections 202 to the ionizer frame 176 at a minimal number of attachment points, i.e., the tabs 207, thereby reducing the potential interference from the frame 176 with the operation of the ground plate 200. This result can also be achieved by forming the ground plate 200 from a conductive wire (not shown) positioned on the ionizer frame 176 in the same or a different configuration from that of the ground plate 200.

Looking now at FIGS. 3, 4, 7 and 8, in order to draw the air and particulates held in the air into the device 100 through the rear housing 106, a fan assembly 173 is secured to the front housing 102 generally opposite the filter tray 154 and filter 162. The assembly 173 includes a fan mounting frame 174 having a central housing 206 including a rotatable shaft 208 operably connected to a motor winding (not shown) disposed within the central housing 206. The central housing 206 is supported approximately concentrically within the frame 174 by a number of support arms 210 that extend radially outwardly from the central housing 206 and are connected opposite the central housing with a peripheral mounting ring 212. The ring 212 is approximately equal in size to the aperture 114 in the front housing 102, and includes a number of outwardly extending sections 213 including apertures 214 therein that are alignable with the securing members (not shown) located on the front housing 102 to affix the fan mounting frame 174 to the front housing 102. Each of the arms 210 can also be generally U-shaped and/or include a number of tabs 211 along one side of the arm 210 that are used to secure wiring (not shown) operably connected to the motor in order to operate the motor and rotate the shaft 208. The impeller or fan 216 that is secured to the shaft 208 on the central housing 206 includes a central portion 218 mountable to the shaft 208 and having a number of blades 220 extending radially outwardly therefrom. The blades 220 can take any shape desired, but are preferably helical in configuration. The central portion 218 of the fan 216 is held on the shaft 208 of the frame 174 using any suitable means, such as a cap (not shown) or other engaging member to ensure that the fan 216 remains on the central portion 206 and the shaft 208 when the device 100 is in operation. The positioning of the fan 216 on the frame 174 allows the fan 216 to draw air into and through the device 100 in an essentially axial direction, assisting in generating the laminar air flow through the device 100. The housing 206 also may include a heat sink (not shown) that can remove some of the heat generated during the operation of the fan 216, in order to increase the operating life of the fan 216, and to reduce the potential ozone production in the device 100.

Figure 3:
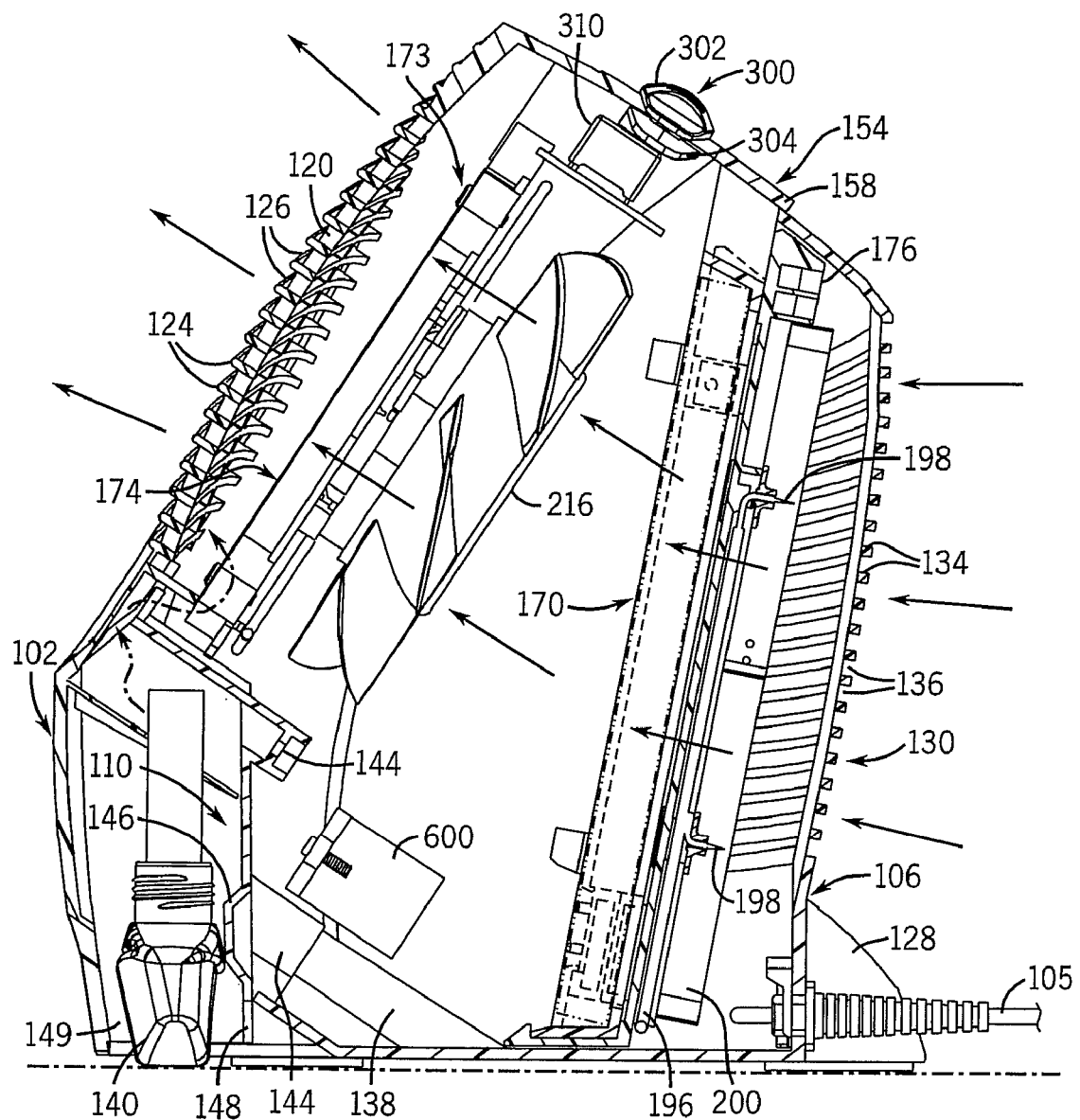
FIG. 3 a cross-sectional view along line 3-3 of FIG. 1.
Figure 7:
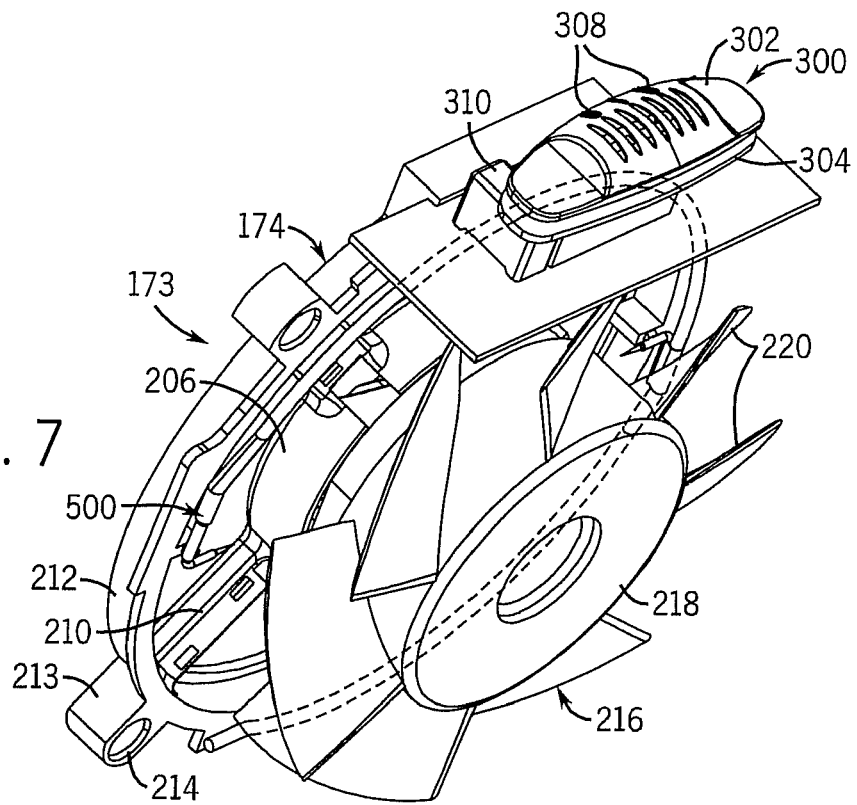
FIG. 7 is an isometric view of a fan mounting frame, fan and downstream ionizing assembly of the air purifier of FIG. 1.
Figure 8:
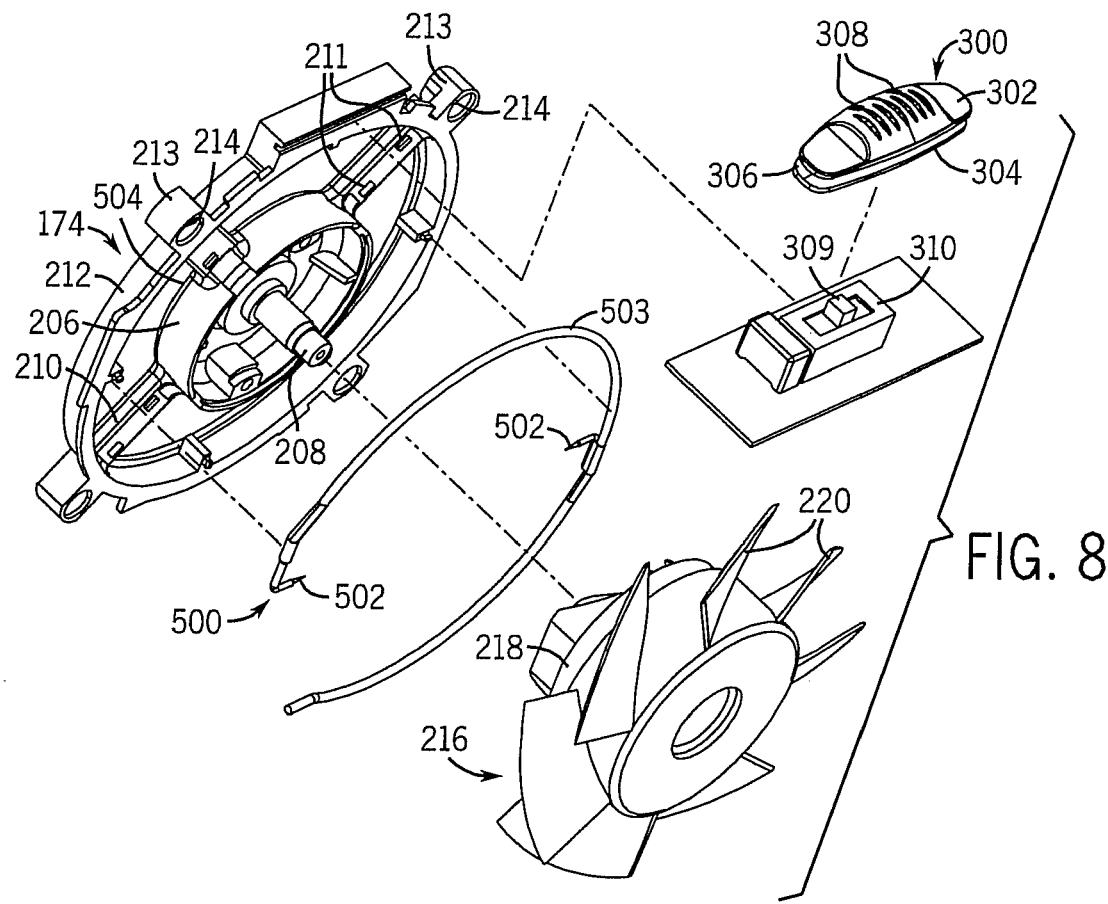
FIG. 8 is an exploded, isometric view of the fan mounting frame, fan and downstream ionizing assembly FIG. 7.
Figure 9:
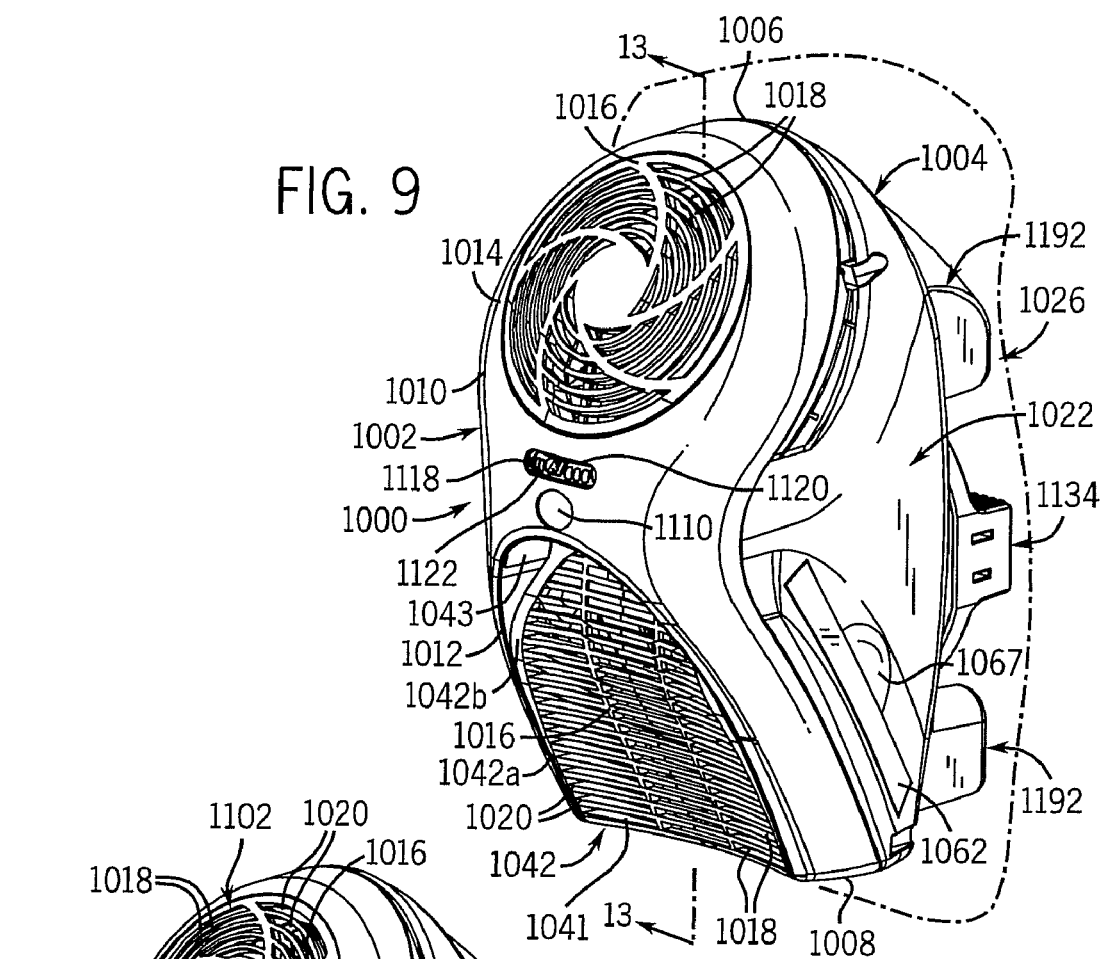
FIG. 9 is an isometric view of a second embodiment of the air purifier constructed according to the present invention.
Figure 10:
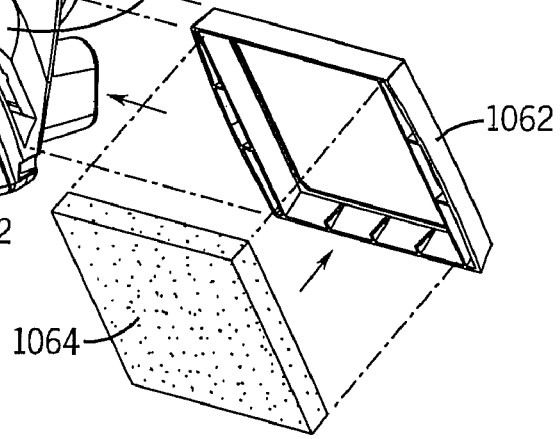
FIG. 10 is a partially exploded, isometric view of the air purifier and a filter tray and filter for the air purifier of FIG. 9.

In FIGS. 3, 7, and 8, a switch 300 secured to the device 100 between the front housing 102 and the rear housing 106 is used to control the operation of the device 100. The switch 300 is secured to the top end of the device 100 and is operably connected to the power supply for the device 100 between the power supply and the connections to indicator light 112, the motor in the fan assembly 173, and the ionizer assembly 194 and ground plate 200, as well as any additional features requiring electrical power on the device 100, such as the optional night light, to selectively operate each of these features of the device 100. The switch 300 can be moved between a number of different positions which correspond to varying operational speeds for the fan 216, but that each also can operate the other features of the device 100. The switch 300 includes an upper portion 302 disposed above the top surface of the device 100 that can be contacted by an individual, and a lower portion 304 separated by a groove 306 that enables the switch to be slidably secured to the device 100. The upper portion 302 also includes indicia 308 that correspond to the various operating conditions for the device 100 that are selectively alignable with indicia (not shown) on the device 100 to enable an individual to select the desired operating conditions for the device 100. The lower portion 304 is operably connected to a sliding control switch 308 located in a switch housing 310 connected to the fan mounting frame 174. The control switch 309 is directly connected to each of the electrically operated components of the device 100 and to a control unit 600 that is utilized to monitor and control the operation of the device 100, such a by wiring (not shown) in order to operate these components as desired. The movement of the upper portion 302 and lower portion 304 by and individual causes similar movement in the control switch 308 to selectively operate the device 100.

The control unit 600 enables the fan 216 to be operated at different speed settings, such as LOW, HIGH, and OFF. The control unit 600 can also be operable to selectively operate the various components of the device 100 as directed by the individual. For example, the control unit 600 can operate the ionizing assemblies 170 and 500 in conjunction with one another, or separately from one another. Further, the control unit 600 can operate the fan assembly 173 simultaneously with either or both of the ionizing assemblies 170 and 500, or without either assembly 170 or 500, or can operate one or both ionizing assemblies 170 and 500 without the fan assembly 173.

In operation, as best shown in FIG. 3, when the switch 300 is moved to operatively connect the device 100 to a power supply, the fan 216 is operated to draw air into the device 100 through the opening 132 in the rear housing 106. The airborne particulates within the air flow drawn through the rear housing 106 come into contact with the cloud of electrons/ions created by the ionizing assembly 170 positioned adjacent the opening 132. The electrons/ions are prevented from exiting the device 100 through the opening 132 by the position of the ground plate 200 between the pins 198 and the opening 132, which directs the particulates and free electrons/ions into the interior of the device 100. The particulates that come into contact with and are subsequently charged by the electrons/ions from the pins 198 pass into and are attracted by the filter 162, which is formed with a charge opposite that of the electrons/ions in order to remove the particulates from the airflow. The remainder of the airflow passes through the filter 162 and past the fan 216 to be directed out of the device 100 and through the front housing 102. Optionally, a volatile from the volatile container 140 can be introduced into the air flow after passing through the filter 162, as described previously. The orientation of the front housing 102 with respect to the rear housing 106, as described previously, provides a preferred 45° angle between the inlet and outlet of the device 100, thus creating an optimal airflow stream through the device 100 in order to most effectively reduce the amount of particulates in the airflow and increase the corresponding clean air delivery rate (CADR) for the device 100. The angle of the flow path defined between the rear housing 106 and the front housing 102 provides benefits to the device 100 in that the residence time of the air flowing through the device 100 is longer than in a device having a straight flow path, thus allowing the electrons/ions generated in the device 100 and the filter 162 to remove an increased amount of particulates from the air flow. This because, due to the slower air flow along the angled flow path, the electrons/ions have a longer time to attach to and charge the particulates, and the filter 162 has a longer time to attract and adhere the charged particulates to the filter 162. Therefore, in conjunction with an air flow speed generated by the fan 216 that is within a certain range (e.g., 0.75 m/s and 1.00 m/s), the angle of the flow path in the device 100 allows for more efficient cleaning of the air.

In an especially preferred embodiment for the device 100 illustrated best in FIGS. 7 and 8, the device 100 can also include a downstream ionizer assembly 500. This assembly 500 can be disposed immediately adjacent the cover 104 on the front housing 102 and includes an number of ionizing pins 502 positioned around the interior of the front housing 102 on a base member 503 and a ground member 504 disposed on or near the center of the cover 104, downstream from the pins 502. The pins 502 generate more electrons/ions that are attracted to any remaining particulates in the air flow that has passed through the filter 162, such that the particulates that exit the device 100 are charged. Based on this charge, the particulates are attracted to various ground surfaces in the surrounding environment around the device 100, including tables, chairs, floors, etc., such that the particulates adhere to these surfaces, effectively removing these remaining particulates from the air. In a particularly preferred embodiment the ionizing pins 502 are disposed on a base member 503 that is mounted in an electrically isolated manner to the peripheral mounting ring 212 of the fan mounting frame 174 to enable the pins 502 to point radially inwardly, and maximize the effectiveness of contacting the electrons/ions generated by the pins 502 with the particulates remaining in the air flow after passing through the filter 162. The ground pin 504 is preferably placed on the frame 174 or the cover 104 concentrically with the frame 174 a specified distance away from the pins 502 in order to maximize the space available for the electron/ion cloud generated by the pins 502, but also to prevent free electrons/ions from exiting the device 100 through the cover 104, thereby minimizing any potential electrostatic discharge at the outlet of the device 100. However, this configuration can also be reversed such that the pins 502 could also be mounted around the cover 104, with the ground member 504 located on the fan mounting frame 174. The ground member 504 could also comprise additional pins (not shown) similar to pins 502 or a ground plate (not shown) similar to ground plate 200. Further, to assist in limiting the effect of any corresponding electrostatic build-up outside of the device 100 at the downstream end, the power supplied to the downstream ionizing assembly 500 can be less than that used at the upstream ionizing assembly 170. This is because the assembly 500 is operating only to charge the particulates sufficiently to be attracted to a ground surface outside the device 100, and not to the filter 162, which requires less power for the ionizing assembly 500 to accomplish.

In addition to the above-cited features and embodiments for the device 100, a number of different variations or alternatives are also contemplated as being within the scope of the present invention. Specifically, the configuration of the interior components of the device 100 can be altered such that the ionizing assemblies 170, 500 can be positioned at either the upstream or downstream end of the device 100 with the fan 216 located at virtually any location, such as at the upstream or intake end of the device 100, and/or adjacent to or spaced from one of the ionizing assemblies 170, 500. Also, the fan 216 can take any suitable form, such as a squirrel cage fan, other than that shown in the preferred embodiments. Additionally, the device 100 can include a retractable cord mechanism (not shown) in order to allow the unit to use only the amount of cord necessary to attach to the cord to the power source. Other options such as night lights and sound, whether white noise, selected noise tracks (waterfall, waves, wind, etc.) or a radio can be added to the device 100. The device 100 may also include a clock in order to enable the device 100 to function additionally as an alarm clock, optionally with the remote control for operation of both the device 100 and the clock. Other features which can be utilized with the device 100 include the generation of oxygen, positive ions, warm or cool air, humidified or dehumidified air, and other additions to the airflow through the device 100 and may also be utilized to remove various odors, irritants, ozone, nitrogen, or humidity from the air flowing through the device 100. Additionally, various sanitizing or germ-killing means may be included within the device 100 to kill any germs, bacteria, viruses, or mold and mildew contained in the air flowing through the device 100.

It is also contemplated that the air speed for the air flowing through the device be controlled in order to optimize the operation and CADR generated by the device 100. More specifically, the airflow is maintained within a specified range beneath the maximum airflow possible through the device 100 in order to enable the ions generated by the ionizing assembly 170 sufficient time to adhere to the particulates in the air flowing through the device 100 and for the ionized particulates to be collected by the filter 162. Should the airflow speed be below this range, insufficient airflow moves through the filter 162, and if the airflow speed is too high, the particulates are moving too fast for the filter 162 to grasp and retain the ionized particulates.

Referring now to FIGS. 9-18, a second embodiment of the air purifier device constructed according to the present invention is indicated generally at 1000. The device 1000 includes a front housing 1002 and a rear housing 1004 each secured to one another and cooperating to form a top 1006 and a bottom 1008 for the device 1000.

As best shown in FIGS. 9-13, the front housing 1002 of the device 1000 is formed of a unitary piece 1010 of a non-conductive, and preferably plastic material having a lower, inlet port 1012 and an upper, outlet port 1014. The lower port 1012 is formed with a generally arch-like shape, and the upper port 1014 is preferably formed to be generally circular in shape, though any other suitable shapes can also be utilized for the port 1012 and 1014. The front housing 1002 is also formed to position the ports 1012 and 1014 at an angle with respect to one another, for reasons to be described.

Figure 11:
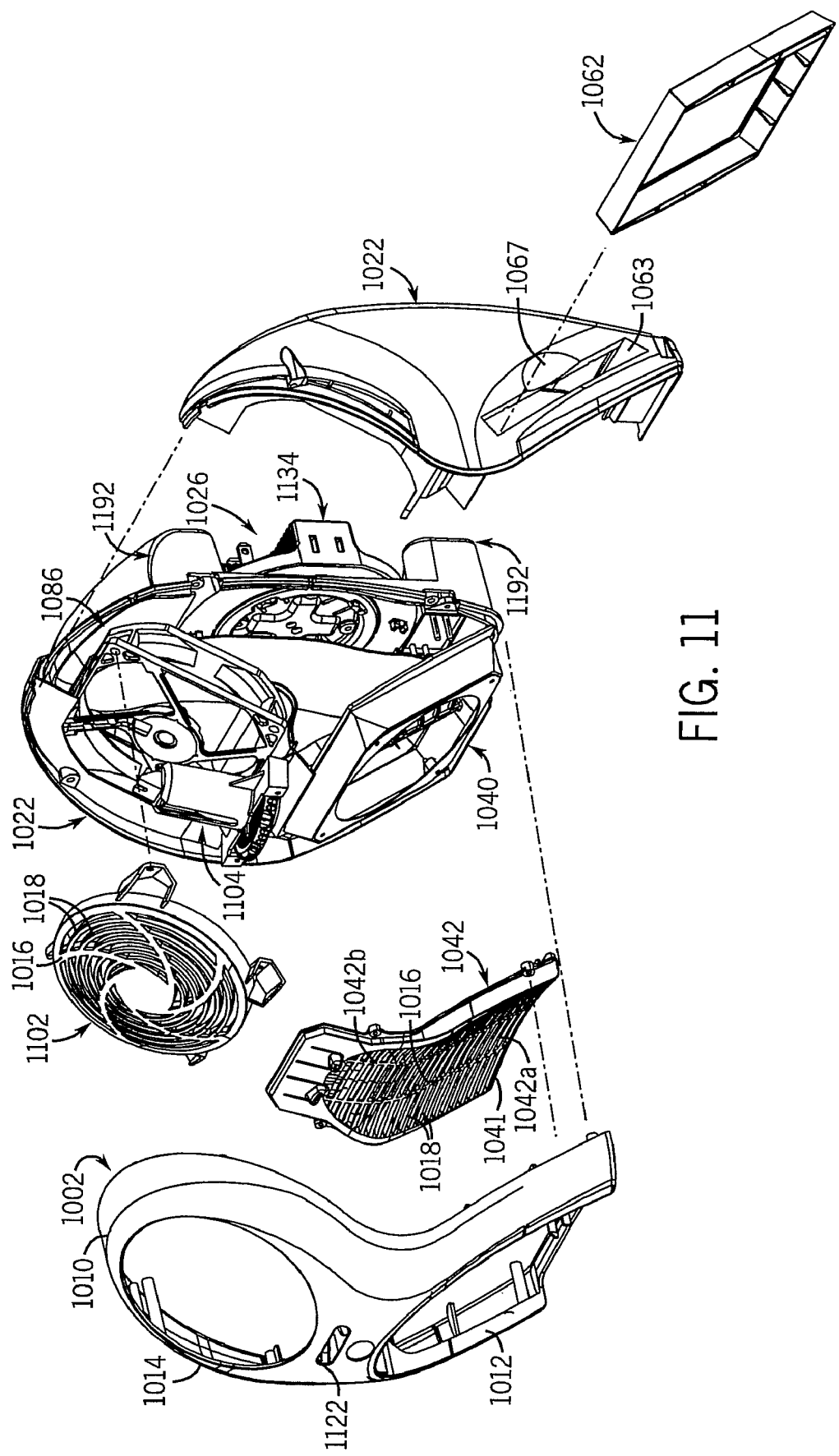
FIG. 11 is a partially exploded, isometric view of the air purifier of FIG. 9.
Figure 12:
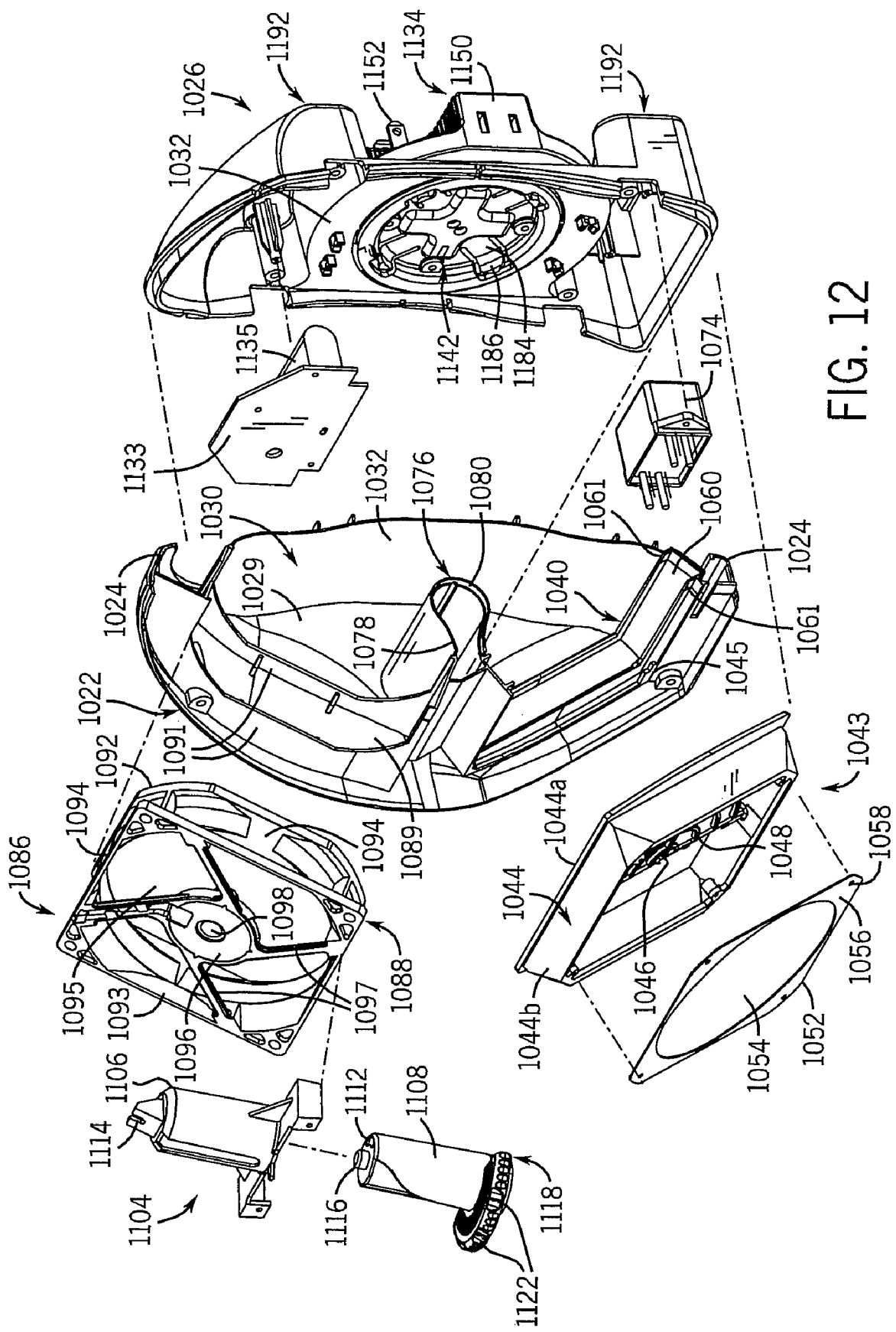
FIG. 12 is an exploded, isometric view of the air purifier of FIG. 11.
Figure 13:
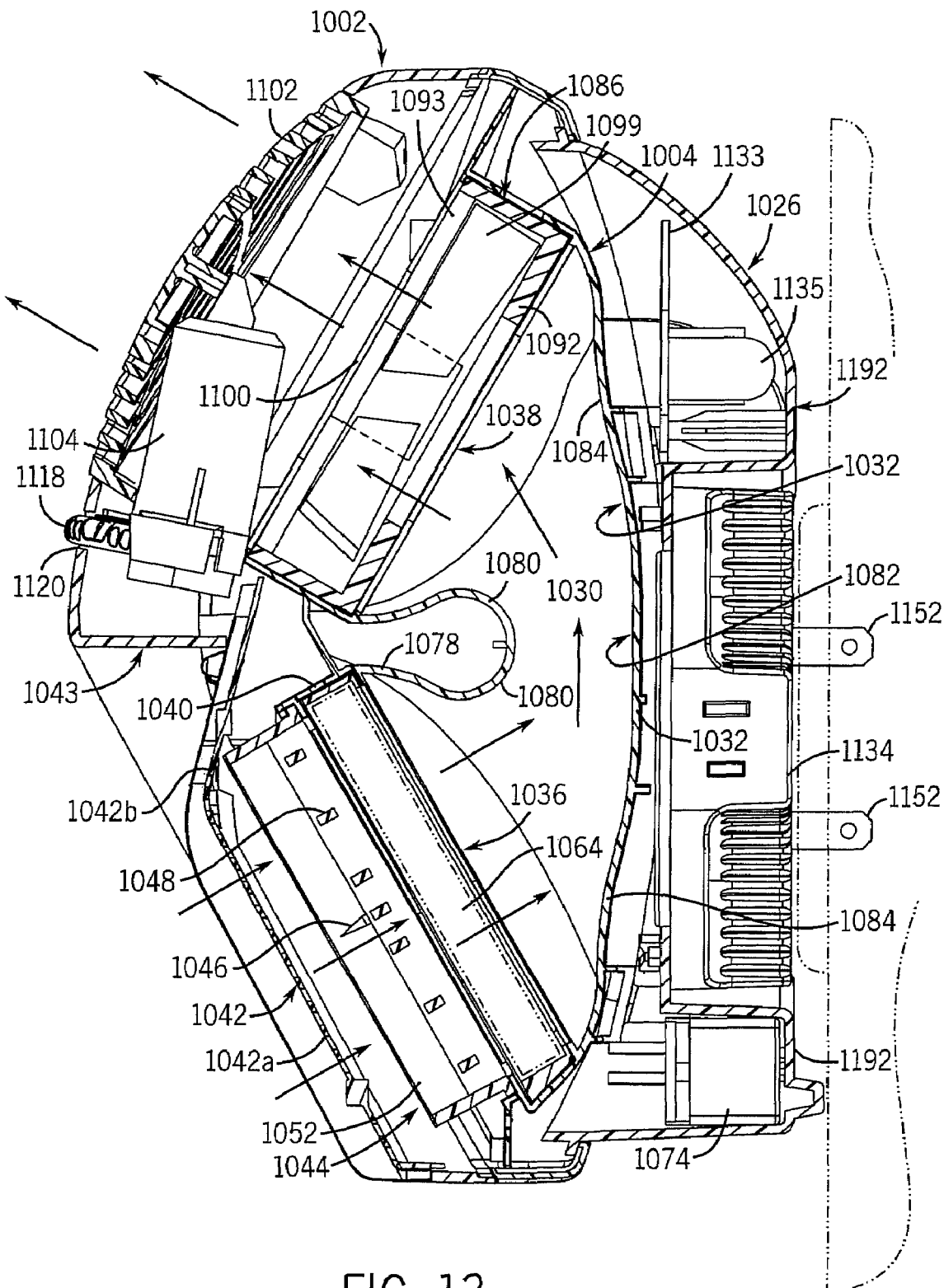
FIG. 13 is a cross-sectional view along line 13-13 of FIG. 9.

The front housing 1002 is joined to the rear housing 1004 generally opposite the ports 1012 and 1014 to enclose the interior of the device 1000. As best shown in FIGS. 11-13, the rear housing 1004 includes a pair of side panels 1022 that are joined to one another to form the rear housing 1004. Each side panel 1022 includes a base portion 1024, adapted to engage a rotatable plug deck assembly 1026, and a main portion 1028 including a side plate 1029 and a main plate 1032 that, in conjunction with the mirror image structures located on the opposite side panel 1022, define an angled air flow chamber 1030 therein. The base portion 1024 and the air flow chamber 1030 are separated by the main plate 1032 that extends the length of each of the side panels 1022. The side panels 1022 are secured to one another using any suitable means, such as fasteners (not shown) that are engageable within securing sleeves (not shown) located on each side panel 1022 in alignment with one another between the base portion 1024 and the main plate 1032, or by other suitable securing means, such as various interlocking portions (not shown) of the panels 1022 or an adhesive or sonic welding that directly secures the side panels 1022 to one another.

The air flow chamber 1030 defined by the assembled side panels 1022 in the rear housing 1004 includes an inlet 1036, disposed adjacent the port 1012 in the front housing 1002, and an outlet 1038 located near the port 1014 in the front housing 1002. The inlet 1036 and the outlet 1038 are disposed at an angle with respect to one another, for the reasons described previously concerning the device 100.

The inlet 1036 includes a filter frame 1040 that is preferably generally rectangular or square in shape, and is secured to, or preferably formed integrally with the side panels 1022 over the inlet 1036. A grill 1042 is attached to either an exterior surface of the frame 1040, or to an interior surface of the front housing 1002 to cover the filter frame 1040 and the inlet 1036. The grill 1042 is generally arch-like in shape to correspond to the shape of the port 1012 in the front housing 1002, and includes a first portion 1042a that extends parallel to the housing 1002 from the bottom 1008, and a second portion 1042b that extends inwardly from the first portion 1042a to define a space 1043 between the second portion 1042b and the front housing 1002. The grill 1042 can have any desired configuration, but preferably is formed with a number of central supports 1016 extending generally vertically across an aperture 1041 defined within the grill 1042, and a number of vanes or dividers 1018 extending generally horizontally across the aperture 1041 perpendicular to the supports 1016. The vanes 1018 divide the aperture 1041 into a number of separate air flow channels 1020, through which air can flow into the air flow chamber 1030 at the inlet 1036.

Directly downstream of the grill 1042, the inlet 1036 of the air flow chamber 1030 includes an upstream ionizing assembly 1043. The assembly 1043 is attached to the filter frame 1040 and includes an assembly support 1044 having a peripheral flange 1044a that is engaged by a number of securing tabs 1045 disposed on and extending outwardly from each corner of the filter frame 1040 to secure the support 1044 to the filter frame 1040. The support 1044 conforms to the shape of the filter frame 1040 and has generally square, inwardly sloping outer wall 1044b, and an ionizing pin 1046 disposed on a cross-member 1048 extending across the center of the support 1044 generally parallel to the central supports 1016 of the grill 1042. The pin 1046 extends outwardly from the cross-member 1048 in a generally upstream direction, and is operably connected to a suitable power source by wiring (not shown). To prevent any current supplied to the pin 1046 from leaking out of the wiring or the pin 1046 prior to being used to generate ions, and thereby lessening the efficiency of the ionizing assembly 1043, the wiring that extends from the pin 1046, and the pin 1046 are each connected to the support 1044 in a manner that electrically isolates the pin 1046 from the non-conductive support 1044. The pin 1046 is formed of an electrically conductive material, such as copper or brass, and, when connected to a power source, operates to discharge electrons/ions from the point of the pin 1046 in a direction opposite to the flow of air into the inlet 1036. These ions generated by the pin 1046 are discharged into the incoming air flow and are attracted and attach to airborne particulates in the air flow. To further maximize the amount of ions that is generated by the pin 1046, the pin 1046 is formed to be as sharp as possible. This is especially important in the present device 1000, as the device 1000 operates at a much lower voltage (>7 kV) than other air purifiers including ionizing assemblies, requiring that the ion output from the pin 1046 be as high as possible for maximum effectiveness of the device 1000.

Electrons/ions generated by the pin 1046 that do not attach to particulates are prevented from exiting the device 1000 through the inlet 1036 by a ground plate 1052 disposed on the support 1044 opposite the filter frame 1040 and between the grill 1042 and the pin 1046. The ground plate 1052 is generally square in shape to conform to the shape of the assembly support 1044 and defines a generally circular opening 1054 generally corresponding in size to the part of the aperture 1041 in the first portion 1042a of the grill 1042 and the space defined within the support 1044, such that the ground plate 1052 does not obstruct the air flow into the inlet 1036. The ground plate 1052 is formed of an electrically conductive material, such as a metal including copper or brass, and is connected to an electrical ground (not shown) via wiring (not shown) in order to function as a ground for the electrons/ions generated by the pin 1046. Thus, the electrons/ions generated by the pin 1046 are restrained from flowing out of the inlet 1036 and forming a charged cloud of electrons/ions on the exterior of the device 1000. This, in turn, prevents electrostatic discharge from occurring when a individual contacts the cloud, consequently becoming charged with the electrons/ions, and subsequently touching an oppositely charged surface. Further, the ground plate 1052 is secured to the support 1044 in any suitable non-conductive manner and by as few connections as possible in order to minimize any current leakage from the ground plate 1052. Preferably, as shown in FIGS. 11 and 12, the plate 1052 has corners 1056 that can be secured to the outer wall 1044b of the support 1044 by suitable fasteners (not shown) inserted through openings 1058 in the corners 1056, or by a frictional interference fit formed between the corners 1056 of the plate 1052 and certain portions of the support wall 1044a.

As best shown in FIGS. 10-13, immediately downstream from the pin 1046, the halves of the filter frame 1040 disposed on each side panel 1022 cooperate to define a filter-receiving slot 1060. The slot 1060 is defined between a pair of inwardly extending flanges 1061 disposed on opposed sides of the slot 1060 that are located in alignment with an opening 1063 in one of the side panels 1022. The slot 1060 and the opening 1063 are dimensioned to slidably receive a filter tray 1062 that holds a filter element 1064 therein. The tray 1062 is formed to have a generally square configuration so as to extend across the entirety of the air flow chamber 1030, so that no incoming air may pass through the chamber 1030 without also passing through the tray 1062. To facilitate the insertion and removal of the tray 1062, the side panel 1022 includes a recess 1067 located immediately adjacent the opening 1063. The recess 1067 allows the peripheral edge of the tray 1062 to be grasped and pulled when the tray 1062 is fully inserted within the opening 1063 to remove the tray 1062 and the filter element 1064 from within the device 1000. Alternatively, the tray 1062 can includes a handle (not shown) that, when the tray 1062 is fully inserted into the opening 1063, is located on the exterior of the device 1000 and can be used to grasp and withdraw the tray 1062 from the slot 1060.

The tray 1062 also includes suitable means (not shown) for securing the filter 1064 therein, such that the filter element 1064 cannot be moved within the filter tray 1062 by the air flow through the chamber 1030.

The filter element 1064 positioned within the tray 1062 is similar to the filter used in the previously described embodiment, and is a high air flow filter having a large number of air flow channels therein to allow for the air flowing through the device 1000 to flow freely through the filter element 1064. However, the filter element 1064 is also formed with an electrical charge that is opposite to the charge of the electrons/ions generated by the pin 1046. Thus, any particulate matter in the air flowing through the filter element 1064 that has been charged by the electrons/ions coming from the pin 1046 is attracted to the filter element 1064 and retained thereon by the attraction between the oppositely charged filter element 1064 and the electrons/ions from pin 1046. In this manner, a significant portion of the particulate matter in the air passing through the device 1000 is removed by the filter element 1064. Additionally, the distance between the ionizing assembly 1044 and the filter element 1064 is selected such that the electrons/ions generated by the pin 1046 have sufficient time to adhere to particulates in the air flow prior to coming into contact with the filter element 1064, such that a greater number of particles in the air flow become charged by the electrons/ions prior to reaching the filter element 1064. This residence time for the particulates in the electron/ion cloud within the device 1000 is also increased by the orientation of the pin 1046, which by pointing upstream, causes the particulates to come into contact with the electrons/ions further upstream of the filter element 1064.

Once a specified amount of particulate matter has been collected by the filter element 1064, the filter tray 1062 can be removed from the device 1000 through the opening 1063 and the filter element 1064 can be cleaned or replaced to continue to effectively remove particulates from the air. Additionally, the device 1000 can employ any suitable type of filter use-up cue (not shown) to indicate when the filter element 1064 needs to be cleaned or replaced, such as a timer, a photo-eye, an air flow or air speed meter that operates an audible or visible signal on the device 1000, or a mechanical obstruction disposed adjacent the filter element 1064. Also, the device 1000 can utilize a lock out mechanism (not shown) that requires that the filter tray 1062 and filter element 164 be properly located within the device 1000 in order for the device 1000 to be activated.

Looking now at FIGS. 11-13, the air flow chamber 1030 is formed by the side panels 1022 where the inlet 1036 and outlet 1038 of the chamber 1030 are each disposed at an angle with regard to each other and to the main plate 1032 defining the chamber 1030. Preferably the inlet 1036 and outlet 1038 are located at angles of between twenty (20) and sixty (60) degrees with respect to the main plate 1032, and most preferably at about forty-five (45) degrees. It should be noted that the fan assembly 1086 described hereinafter could also be mounted with a flow axis at 0° (horizontal) or 90° (vertical).

The inlet 1036 and the outlet 1038 are separated by a baffle 1076, formed by a pair of opposed halves 1076a connected to each of the side panels 1022 and forming the baffle 1076 when the side panels 1022 are joined to one another. The baffle 1076 extends inwardly from the side plate 1029 of each side panel 1022 into the air flow chamber 1030 generally perpendicular to the direction of the air flow though the chamber 1030. The baffle 1076 has a narrow end 1078 secured to the filter frame 1040 on one side and to a fan frame 1088 on the other side. Between the sides of the narrow end 1078, the baffle 1076 defines a wide end 1080 positioned within the air flow chamber 1030. The wide part 1080 of the baffle 1076 is spaced from a central portion 1082 of the main plate 1032 a sufficient distance to allow air flow in a predetermined path through the chamber 1030 between the central portion 1082 of the main plate 1032 and the wide portion 1080 of the baffle 1076. On each side of the central portion 1082, the main plate 1032 includes curved restrictive sections 1084 that, in conjunction with the baffle 1076, operate to direct the incoming and outgoing air flow into the space defined between the wide end 1080 of the baffle 1076 and the central portion 1082 of the main plate 1032. The narrowing of the flow path in the chamber 1030 is accomplished by smooth surfaces on the curved restricted sections 1084 that allow the air to continue flowing in the same general direction, but merely through a smaller cross-sectional space. In short, the shape of the baffle 1076, the main plate 1032 and the corresponding angles of the inlet 1036 and outlet 1038 that control incoming and outgoing air flow operate to create a generally laminar air flow through the entire air flow chamber 1030. As a result, the air entering the device 1000 enters equally along the entire area of the inlet 1036, such that entire surface of the filter element 1064 is used to remove particulates from the air stream, and not just the central portion of the filter 1064, as in prior art devices. Further, the preferred forty-five (45) degree angle for the incoming air flow at the inlet 1036 of the device 1000 ensures that the air entering the device 1000 comes from the interior of the room in which the device 1000 is positioned, and not just merely air near the floor of the room. This is especially important in the case of this device 1000 that is secured to an electrical outlet (not shown), such that there is a limited amount of space around the device 1000 from which incoming air can be drawn. Similarly, the angle of the outlet 1038 allows the cleaned air exiting the device 1000 to be expelled above the inlet 1036, to ensure more circulation of the air within the room, and to avoid the repeated cleaning of the same volume of air located either at the same height or below the height of the device 1000 in the room.

In order to move the air into and out of the device 1000, the device 1000 also includes a fan assembly 1086 preferably disposed immediately upstream of the outlet 1038, though the fan assembly 1086 can be located anywhere within the device 1000 downstream of the ionizing assembly 1044. The fan assembly 1086 includes a frame 1088 secured within a fan-mounting channel 1089 formed between the side panels 1022 that extends completely across the outlet 1038. The mounting channel 1089 is formed similarly to the filter frame 1040 and includes a pair of inwardly extending flanges 1091 that define the channel 1089 therebetween. The fan-mounting frame 1088 can be positioned between the flanges 1091 in order to secure the frame 1088 and the fan 1086 at the outlet 1038 of the air flow chamber 1030. While the frame 1088 can have any suitable configuration, in the preferred embodiment shown best in FIGS. 11-13, the frame 1088 includes an inner member 1092 that is generally square in shape and is joined to an outer member 1093 by a number of struts 1094. The outer member 1093 is also generally square in shape to conform to the shape of the inner member 1092, and the frame 1088 is formed to have an overall width that is slightly less than the distance between the flanges 1091 forming the channel 1089. This allows the frame 1088 to be securely engaged between the flanges 1091 when the frame 1088 is inserted into the channel 1089 during assembly of the device 1000.

Both the inner member 1092 and the outer member 1093 are formed as generally open structures, with each defining a central opening 1095 through which air can flow from the outlet 1038 of the chamber 1030 and out of the device 1000. The outer member 1093 also includes a central support 1096 disposed in the center of the central opening 1095 of the outer member 1093, and held there by a number of support arms 1097 extending between the support 1096 and the outer member 1093. The central support 1096 includes a center aperture 1098 to which can be secured the rotating shaft (not shown) of an impeller 1099. The shaft and the impeller 1099 are driven by a suitable motor 1100 that is operably connected to the power source for the device 1000. The impeller 1099 is dimensioned to fit entirely within the frame 1088, such that the impeller 1099 can rotate within the frame 1088 without contacting any portion of the frame 1088. Also, the motor 1100 is preferably disposed on the central support 1096 to minimize the amount of obstruction by the motor 1100 of the air flow past the fan assembly 1086. Optionally, a downstream ionizer (not shown) constructed similarly to that described with regard to the previous embodiment for the device can also be affixed to the central support 1096 opposite the impeller 1099 in order to charge those particles not entrapped by the filter element 1064 that exit the device 1000 for attraction to an oppositely charged surface around the device 1000 for later cleaning.

At this location, the fan assembly 1086 can be operated to drive air into and out of the device 1000 across the entire cross-section of the air flow chamber 1030 within the device 1000. The fan assembly 1086 can be any suitable type of fan, such as a squirrel cage or centrifugal fan, but preferably is an axial fan to maximize the draw of air through the chamber 1030 and to reduce the overall level of noise output by the device 1000. The driving motor 1100 operably connected fan assembly 1086 can be controlled using a control means 1074 operably connected to the motor 1100, and any suitable manual or remote operating control switch (not shown) to rotate the impeller 1099 of the fan assembly 1086 at a desired speed. The speed of the fan motor 1100 is controlled to maintain the air flow speed through the device 1000 at a level that prevents air from stagnating within the device 1000, but that also allows the electrons/ions from the ionizing assembly 1044 sufficient time to attach to and attract the particulates to the filter element 1064, without drawing the charged particulates past the filter element 1064.

Adjacent the fan assembly 1086, and opposite the outlet 1038 from the chamber 1030, a second grill 1102 is secured to the front housing 1002 within the upper port 1014. The second grill 1102 conforms in shape to the upper port 1014, and in a preferred embodiment, has a number of helically extending supports 1016 between which extend a number of circular vanes 1018, that cooperate to define flow channels 1020 in the second grill 1102, similar to the flow channels 1020 in the first grill 1042. The channels 1020 in the second grill 1102 serve to allow the cleaned air to flow out of the device 1000, while the grill 1102 also prevents access to the fan assembly 1086.

Between the fan assembly 1086 and the second grill 1102 is disposed a volatile dispensing assembly 1104. The volatile dispensing assembly 1104 includes a support housing 1106 that is secured to the one or both of the front housing 1002 or the rear housing 1004, and a volatile container housing 1108 rotatably secured to and within the support housing 1106 and that receives therein a volatile container (not shown) formed similar to container 140 in the previous embodiment, and holding an amount of an air-freshening or air-scenting compound. In one preferred embodiment, the compound to be utilized in freshening the outlet air flow is OUST®. OUST® is available from S. C. Johnson & Son, Inc., Racine, Wis. The container is insertable into the container housing 1108 through the space 1043 defined between the front housing 1002 and the second portion 1042*b* of the first grill 1042. The container can be affixed within the container housing 1108 in any suitable and releasable manner, such that the container can be withdrawn from the container housing 1108 when the volatile in the container is completely dispensed. To control the volume of the volatile that is dispensed from the container, the container housing 1108 is rotatable with respect to the support housing 1106 to selectively position a dispensing aperture 1112 in the container housing 1108 in alignment with a dispensing opening 1114 in the support housing 1106.

The container housing 1108 includes a shaft 1116 that is rotatably engaged with respect to the support housing 1106, and an adjustment knob 1118 extending outwardly from the container housing 1108 generally opposite the shaft 1116. The knob 1118 extends from the container housing 1108 out an aligned opening 1120 in the front housing 1002, such that the knob 1118 can be engaged by an individual to rotate the knob 1118 and the container housing 1108 within the support housing 1106. Various suitable indicia 1122 are printed or otherwise disposed on the knob 1118 to indicate the relative amount of volatile compound that is released from the container at a given position for the knob 1118.

To dispense the volatile compound into the air flow through the outlet 1038 of the device 1000, any suitable method as is known in the art, such as using the Venturi effect of the outlet air stream flowing past and around the dispensing opening 1114 in the support housing 1106, among others. The volatile assembly 1104 can also be located at other points along the air flow chamber 1030 downstream from the ionizing assembly 1044 and the filter element 1064 in the device 1000, such as adjacent the baffle 1076 within the chamber 1030.

The volatile assembly 1104 may also include other features, such as a light emitting diode or LED (not shown) disposed directly behind the container housing 1108 and container that is connected to the control means 1074 that is also used to control other functions of the device 1000. The LED is preferably operably connected to a light sensor (not shown) capable of sensing the level of ambient light in the room in which the device 100 is positioned. When the ambient light level falls below a preset limit, the control means 1074 operates to turn on the LED and shine light through the container that is visible through an aperture 1110 located below the knob 1118. The LED may also function as a night light and always be "on" but only be visible at night.

Looking now at FIGS. 14-18, the base portions 1024 of each side panel 1022 form an enclosure 1124 on the rear housing 1004 opposite the air flow chamber 1030 when assembled with one another. The enclosure 1124 defines a generally elongate opening 1126 that extends through the base portion 1024 opposite the main plate 1032 and forms a peripheral flange 1128 around the entire opening 1126. The flange 1128 extends inwardly around the opening 1126 and engages an aligned peripheral tab 1130 disposed on a mounting plate 1132 for the plug deck assembly 1026. For additional support between the mounting plate 1132 and the main plate 1032, a support member 1133 including a support flange 1135 is secured to the main plate 1032 with the support flange 1135 extending into and engaged with the mounting plate 1132 adjacent the upper end of the mounting plate 1132.

On the mounting plate 1132, the plug deck assembly 1026 includes a rotating plug housing 1134, a pair of first electrical contact inserts 1136 positioned in the housing 1134, a pair of second electrical contact inserts 1138 positioned within the housing 1134 adjacent the first contact inserts 1136, a plug deck cap 1140 secured to the housing 1134 of the inserts 1136 and 1138, and a retaining ring 1142 secured to the cap 1140.

The plug housing 1134 is formed of an electrically non-conductive material and is generally circular in shape, including an open end 1144 disposed above a number of electrical contact conduits 1146 and 1148 formed within the housing 1134. The conduits 1146 and 1148 also each are connected to one blade 1160 or 1162 of a pair of plugs 1152 extending outwardly from a closed end 1154 of the housing 1134 disposed opposite the open end 1144. The plugs 1152 are oriented on the closed end 1154 in a configuration that enables both plugs 1152 to be inserted simultaneously into the receptacles in a conventional residential power outlet (not shown). This not only provides additional power for the operation of the device 1000, but also provides added support for the device 1000 on the wall in which the outlet is located.

The conduits 1146 and 1148 also extend between adjacent pairs of outlets 1150 spaced equidistant around the periphery of the housing 1134. The outlets 1150 each include openings 1149 formed therein that are shaped similarly to the receptacles formed in the power outlet on the wall to which the device 1000 is mounted, and can engage a plug from an electrically-operated device (not shown) separate from the device 1000. Each outlet 1150 is disposed at one end of a cross-shaped section 1151 of the housing 1134 that extends between the open end 1144 and the closed end 1154. The cross-shaped section 1151 includes a number of arms 1153 extending radially outwardly from a central portion 1155, with the outlets 1150 disposed at the end of each arm 1153 opposite the central portion 1155. Each pair of adjacent arms 1153 is joined by a side wall 1159 that includes a number of spaced gripping members 1161 thereon, to assist in moving the outlets 1150 and the housing 1134, in a manner to be described.

Figure 17:
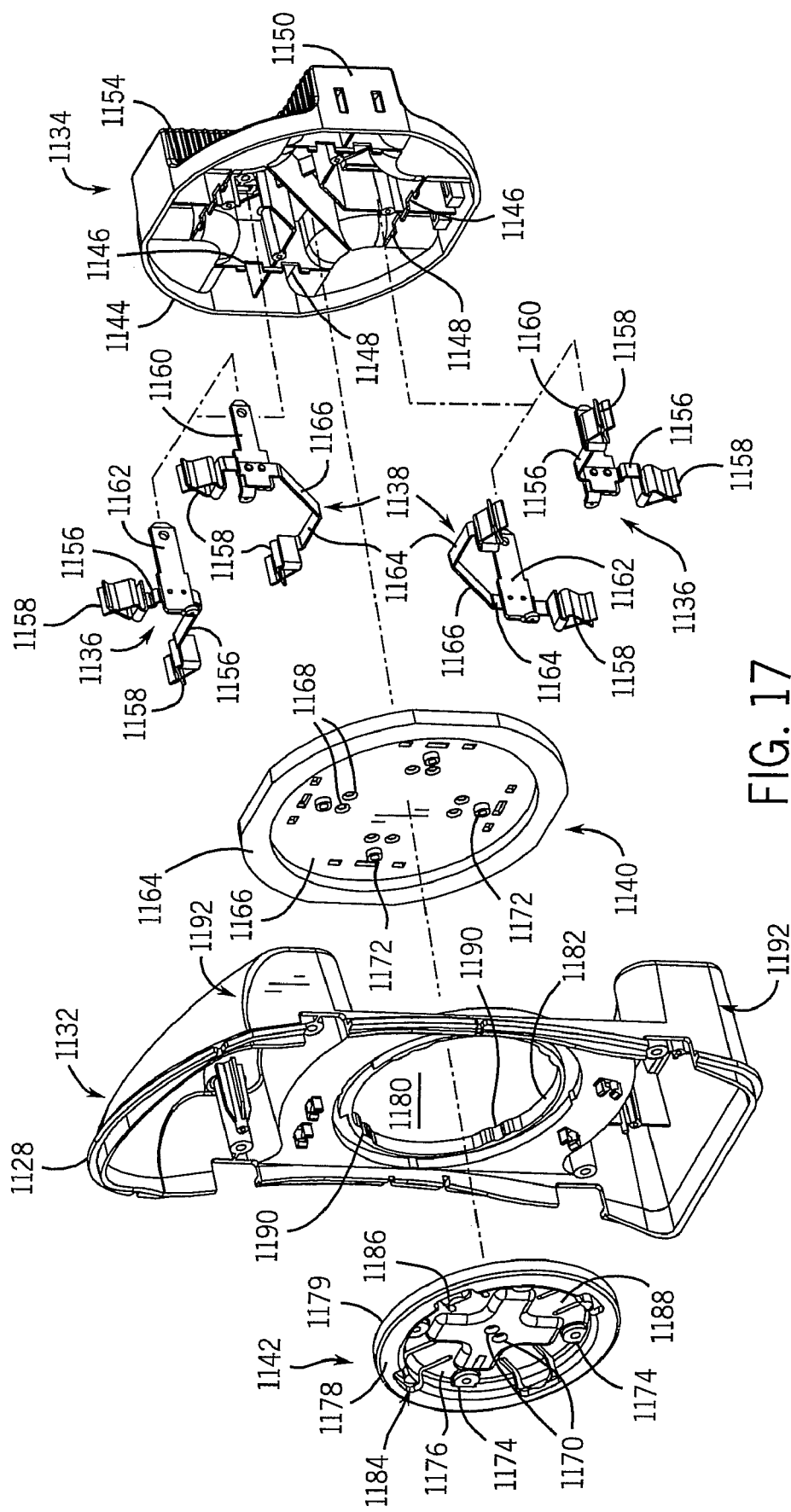
FIG. 17 is an exploded, isometric view of the plug deck assembly of FIG. 16.
Figure 18:
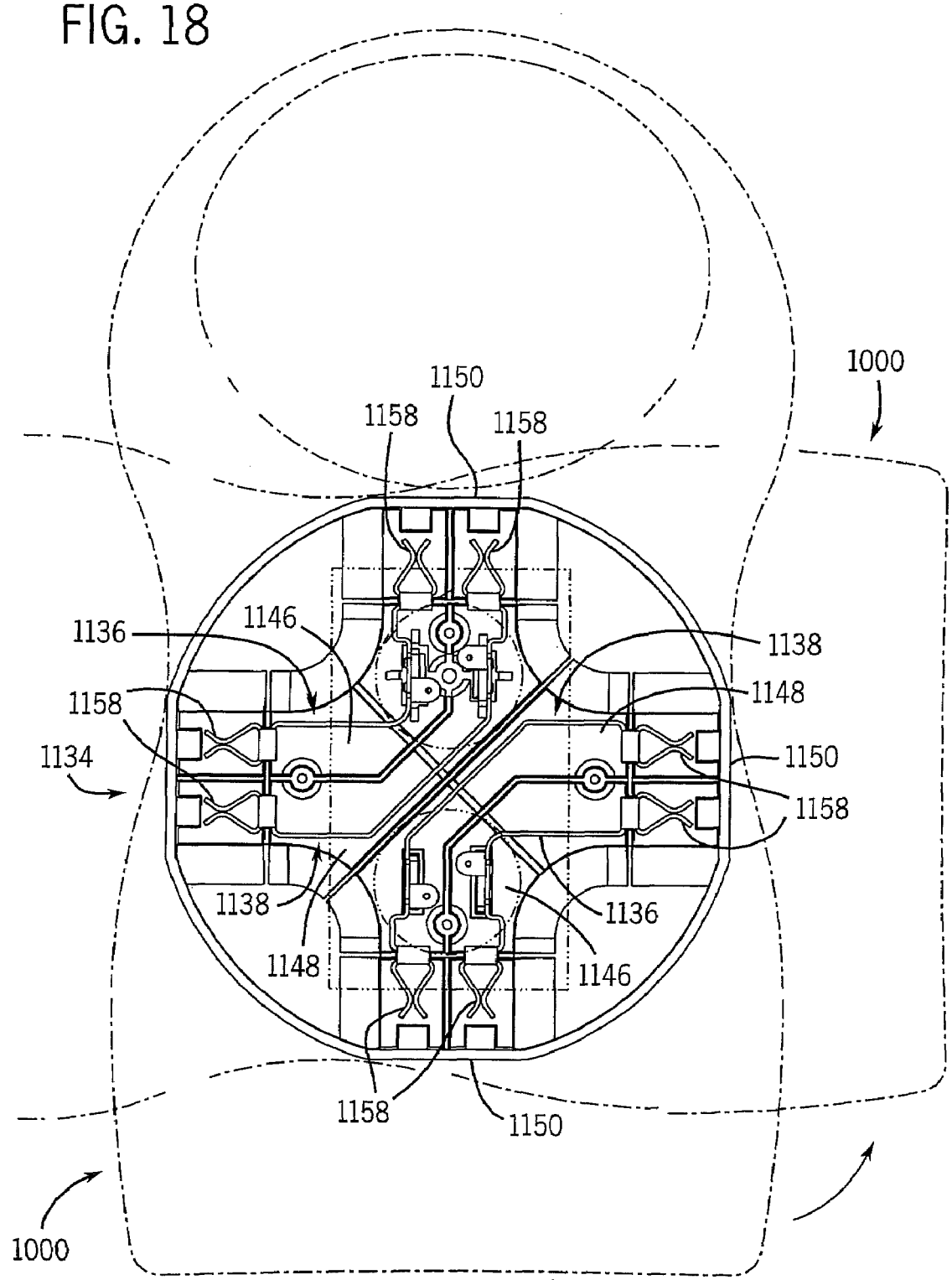
FIG. 18 is a front plan view of the interior of the plug deck assembly of FIG. 17.

Looking now at FIGS. 17 and 18, the structure for the first contact inserts 1136 and the second contact inserts 1138 are disclosed. The first inserts 1136 are formed of an electrically conductive material, such as metal, and are generally L-shaped, with a pair of straight sections 1156 joined to one another and ending in blade engaging portions 1158. The first inserts 1136 can be connected either to a thin blade 1160, or to a thick blade 1162 depending on the desired configuration for the plugs 1152 extending out of the closed end 1154 of the housing 1134. When located within the housing 1134, the blade engaging portions 1158 of each insert 1136 are disposed immediately adjacent the openings 1149 in the outlets 1150 formed on the periphery of the housing 1134. Thus the first inserts 1136 operate to electrically connect a plug blade (not shown) inserted into one of the pair of openings 1149 in the outlet 1150 with incoming power from one of a pair of blades of the plug 1152 inserted into the electrical outlet.

Similarly, the second inserts 1138 are formed with a pair of straight sections 1164 joined by an angled section 1166. The straight sections 1164 each terminate in blade engaging portions 1158 located immediately adjacent aligned openings 1149 in the outlets 1150, and the second inserts 1138 can be connected to either a thin blade 1160 or a thick blade 1162, as necessary. In this manner, the second inserts 1138 electrically connect the other of the pair of openings 1149 in the outlet 1150 with power coming from the other of the pair of blades of the plug 1152 to complete the circuit between the outlets 1150 and the plugs 1152 for supplying power to the device 1000 and to other devices (not shown) connected to one of the outlets 1150. In addition, the shape of the housing 1134 can be varied as desired, such as into a generally cylindrical shape, to accommodate different configurations for the device 1000 and the plug deck 1026.

Referring now to FIGS. 16 and 17, the plug deck cap 1140 is shown. The cap 1140 is formed of a non-conductive material, such as a plastic material and is shaped to conform to the shape of the open end 1144 of the housing 1134, such that the cap 1140 can fit within the open end 1144 of the housing 1134 and enclose the interior of the housing 1134. The cap 1140 is formed with a peripheral rim 1164 that is positioned flush with the outermost edge of the open end 1144 of the housing 1134, and a recessed portion 1166 disposed within the rim 1164. The recessed portion 1166 includes a number of openings 1168 spaced about the portion 1166 that are located adjacent the various inserts 1136 and 1138 within the housing 1134. These openings 1168 enable fasteners (not shown) to be inserted through the openings 1168 to secure the cap 1140 to the housing 134 and to enable electrical connections, such as wires (not shown) to extend from the inserts 1136 and 1138 through the openings 1168 into aligned openings 1170 in the center of the retaining ring 1142 and into the device 1000 for connection with the ionizing assembly 1044, the control unit 1074 and the fan assembly 1086. The openings 1170 in the ring 1142 are preferably disposed in the center of the ring 1142 to prevent the wiring from becoming twisted and potentially broken due to the rotation of the housing 1134.

The recessed portion 1166 also includes a number of sleeves 1172 that extend outwardly from the recessed portion 1166 and are insertable into securing apertures 1174 located in the retaining ring 1142 disposed in alignment with the sleeves 1172 to attach the cap 1140 to the retaining ring 1142. The retaining ring 1142 is formed of an electrically non-conductive material and includes a central recessed portion 1176 and a peripheral flange 1178 that is positioned around the recessed portion 1176 and includes a downwardly extending rim 1179 opposite the recessed portion 1176. The recessed portion 1176 is dimensioned to extend through an aperture 1180 formed by a locking ring 1182 disposed on the mounting plate 1132 for engagement with the recessed portion 1166 of the cap 1140. The recessed portion 1176 also includes a number of locking members 1184 disposed around the recessed portion 1176. The locking members 1184 each include a locking tab 1186 that is positioned directly beneath the peripheral flange 1178 of the ring 1142, and a biasing member 1188 connecting the tab 1186 to the recessed portion 1176. The tab 1186 is engagable within one of a number of locking grooves 1190 spaced around the interior periphery of the locking ring 1182. The tabs 1186 are seated within each of the grooves 1190 until a force is exerted on the device 1000 that exceeds the biasing force applied to the tabs 1186 by the biasing member 1188 to maintain the tabs 1186 within the grooves 1190. The tabs 1186, the ring 1142, the cap 1140 and the housing 1134 can then be rotated to align the plugs 1152 with the receptacles on the wall outlet to position the device 1000 in a vertical configuration regardless of whether the outlet to which the device 1000 is mounted is a horizontal outlet or a vertical outlet. Further, the spacing of the locking grooves 1190 positions the plug deck housing 1134 in a position where two of the outlets 1150 are exposed on opposite sides of the plug deck assembly 1026. This ensures that the device 1000, when mounted to a wall outlet, provides the same number of receptacles for attachment of separate electrically-powered devices as the wall outlet without the device 1000 attached thereto.

In addition, the peripheral flange 1178 and rim 1179 on the ring 1142 serve to engage the inner edge of the locking ring 1182, with the locking ring 1182 positioned between the rim 1179 and the recessed portion 1176 directly beneath the flange 1178. This engagement, in conjunction with the connection of the recessed portions 1166 and 1176 of the cap 1140 and ring 1142, respectively, operates to hold the plug deck housing 1134 on the mounting plate 1132 in a rotatable manner, while maintaining the position of the plug deck housing 1134 adjacent the mounting plate 1132.

When the device 1000 is mounted to the wall outlet, additional stability is provided to the device 1000 by a pair of stops or projections 1192 extending rearwardly from the mounting plate 1132 on opposite sides of the plug deck housing 1134. The stops 1192 are preferably integrally formed with the mounting plate 1132 and each include a curved wall 1194 extending outwardly from the mounting plate 1132 and disposed adjacent the plug housing 1134 to allow the housing 1134 to rotate freely without interference from the stops 1192, and a generally planar outer wall 1196 connected to the curved wall 1192 opposite the mounting plate 1132. The outer wall 1196 of each stop 1192 functions to engage the wall on which the outlet is located to one side of the outlet in order to hold the device 1000 in the preferred, generally vertical position on the wall.

In a third embodiment of the present invention, best shown in FIG. 19, the device 1000 shown in FIGS. 9-18 is modified to omit the plug deck assembly 1026, and substitute therefore a power module 1200 including an electric cord 1202. The power module 1200 is operably connected to the ionizing assembly 1044, the control unit 1074 and the fan assembly 1086, similarly to the plug deck assembly 1026, in order to supply power to the device 1000 via a receptacle in which a plug (not shown) on the cord 1202 is inserted. The cord 1202 extends rearwardly from a housing 1204 for the module 1200 secured to the rear housing 1004 of the device 1000 opposite the chamber 1030. The housing 1204 has a foot 1206 disposed on a lower surface thereof that, in conjunction with a pair of supports 1208 attached to and extending downwardly from the bottom 1008 of the device 1000, allows the device 1000 to be positioned upon a flat surface 1210, such as a table, shelf, desk, or the like, to provide air purification to the environment surrounding the surface 1210. The housing 1204 can also include a switch 1212 that is used to control the operation of the device 1000 in a known manner.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the individual components need not be formed in the disclosed shapes, or assembled in the disclosed configuration, but could be provided in virtually any shape, and assembled in virtually any configuration. Further, although the filter described herein is a physically separate module, it will be manifest that the may be integrated into the apparatus with which it is associated. Furthermore, all the disclosed features of each disclosed embodiment can be combined with, or substituted for, the disclosed features of every other disclosed embodiment except where such features are mutually exclusive.

What is claimed is:

1. An air purifier comprising a housing defining an inlet, an outlet spaced from the inlet, and an air flow path extending between the inlet and the outlet, the air flow path including a straight section extending from one of the inlet or the outlet, and an angled section extending from the straight section towards the other of the inlet or the outlet, wherein the angled section defines an angle with respect to the straight section that optimizes the purification of air moving through the device along the air flow path and a baffle disposed within the air flow path at the intersection of the straight section and the angled section wherein the baffle includes a narrow end connected to the housing and a wide end located opposite the narrow end and disposed within the air flow path.

2. An air purifier comprising a housing defining an inlet, an outlet spaced from the inlet, and an air flow path extending between the inlet and the outlet, the air flow path including a straight section extending from one of the inlet or the outlet, and an angled section extending from the straight section towards the other of the inlet or the outlet, wherein the angled section defines an angle with respect to the straight section that optimizes the purification of air moving through the device along the air flow path and a baffle disposed within the air flow path at the intersection of the straight section and the angled section wherein the baffle includes a narrow end connected to the housing and a wide end located opposite the narrow end and disposed within the air flow path, wherein the baffle is formed of an elongate planar member having a pair of opposed ends and a pair of opposed sides extending between the pair of opposed ends, wherein the pair of opposed ends form the narrow end and are secured to the housing generally perpendicular to the air flow path.

3. An air purifier comprising a housing defining an inlet, an outlet spaced from the inlet, and an air flow path extending between the inlet and the outlet, the air flow path including a straight section extending from one of the inlet or the outlet, and an angled section extending from the straight section towards the other of the inlet or the outlet, wherein the angled section defines an angle with respect to the straight section that optimizes the purification of air moving through the device along the air flow path and a baffle disposed within the air flow path at the intersection of the straight section and the angled section wherein the angled section forms an angle of between about 20° to about 60° with respect to the straight section.

4. The air purifier of claim 3 further comprising an ionizing mechanism disposed within the housing across the air flow path, the ionizing mechanism including a first ionizing assembly having a pin assembly disposed within the air flow path, and a ground member disposed around the pin assembly along the periphery of the air flow path upstream of the pin assembly.

5. An air purifier comprising a housing defining an inlet, an outlet spaced from the inlet, and an air flow path extending between the inlet and the outlet, the air flow path including a straight section extending from one of the inlet or the outlet, and an angled section extending from the straight section towards the other of the inlet or the outlet, wherein the angled section defines an angle with respect to the straight section that optimizes the purification of air moving through the device along the air flow path and a baffle disposed within the air flow path at the intersection of the straight section and the angled section wherein the angled section forms an angle of between about 20° to about 60°with respect to the straight section, further comprising an ionizing mechanism disposed within the housing across the air flow path, the ionizing mechanism including a first ionizing assembly having a pin assembly disposed within the air flow path, and a ground member disposed around the pin assembly along the periphery of the air flow path upstream of the pin assembly and further comprising an air movement mechanism disposed in the housing across the air flow path, the air movement mechanism including:
   a) a mounting frame having a central portion, a number of support arms extending outwardly from the central portion and an outer ring connected to the support arms and spaced from the central portion;
   b) an impeller rotatably mounted to the central portion; and
   c) a second ionizing assembly secured to the mounting frame, the second ionizing assembly including a conducting base member mounted to the ring, at least one first pin extending radially inwardly from the base member, and at least one second pin mounted to the central portion.

6. The air purifier of claim 5 wherein the at least one first pin is an ionizing pin and the at least on second pin is a ground pin.

7. The air purifier of claim 5 further comprising a filter element disposed within the housing across the air flow path and spaced from the air movement mechanism, the filter having a charge opposite to a charge created by the first ionizing assembly.

8. The air purifier of claim 7 wherein the filter element is disposed upstream of the air movement mechanism.

9. An air purifier comprising:
   a) a housing defining an inlet, an outlet spaced from the inlet, and an air flow path extending between the inlet and the outlet, the air flow path including a straight section extending from one of the inlet or the outlet, and an angled section extending from the straight section towards the other of the inlet or the outlet, b) an ionizing mechanism disposed within the housing across the air flow path adjacent the inlet, the ionizing mechanism including a first ionizing assembly having a pin assembly disposed within the air flow path, and a ground member disposed around the pin assembly along the periphery of the air flow path upstream of the pin assembly, c) a filter element disposed within the housing across the air flow path and spaced from the ionizing mechanism, the filter having a charge opposite to a charge created by the first ionizing assembly and further comprising a filter frame disposed within the housing across the air flow path, wherein the pin assembly is fixed to the filter frame, and wherein the filter is slidably mounted to the filter frame.

10. The air purifier of claim 9 wherein the ground member is fixed to the filter frame.

11. The air purifier of claim 9 further comprising a filter tray in which the filter is removably positioned, the filter tray slidably engagable with the filter frame to position the filter perpendicularly to the air flow path.

12. An air purifier comprising:
a) a housing defining an inlet, an outlet spaced from the inlet, and an air flow path extending between the inlet and the outlet, the air flow path including a straight section extending from one of the inlet or the outlet, and an angled section extending from the straight section towards the other of the inlet or the outlet, b) an ionizing mechanism disposed within the housing across the air flow path adjacent the inlet, the ionizing mechanism including a first ionizing assembly having a pin assembly disposed within the air flow path, and a ground member disposed around the pin assembly along the periphery of the air flow path upstream of the pin assembly, further comprising an air movement mechanism disposed in the housing across the air flow path adjacent the outlet, the air movement mechanism including:

a) mounting frame having a central portion, a number of support arms extending outwardly from the central portion and an outer ring connected to the support arms and spaced from the central portion;

b) an impeller rotatably mounted to the central portion; and c) a second ionizing assembly secured to the mounting frame, the second ionizing assembly including a conducting base member mounted to the ring, at least one first pin extending radially inwardly from the base member, and at least one second pin mounted to the central portion.

13. An air purifier comprising:
a) a housing defining an inlet, an outlet spaced from the inlet, and an air flow path extending between the inlet and the outlet, the air flow path including a straight section extending from one of the inlet or the outlet, and an angled section extending from the straight section towards the other of the inlet or the outlet, wherein the angled section defines an angle of between about 20° to about 60° with respect to the straight section;

b) an ionizing mechanism disposed within the housing adjacent the inlet across the air flow path, the ionizing mechanism including a first ionizing assembly having a pin assembly disposed within the air flow path, and a ground member disposed around the pin assembly along the periphery of the air flow path upstream of the pin assembly;

c) an air movement mechanism mounted adjacent the outlet including a mounting frame having a central portion, a number of support arms extending outwardly from the central portion and an outer ring connected to the support arms and spaced from the central portion, an impeller rotatably mounted to the central portion, and a second ionizing assembly secured to the mounting frame, the second ionizing assembly including a conducting base member mounted to the ring, at least one first pin extending radially inwardly from the base member, and at least one second pin mounted to the central portion; and d) a filter element disposed within the housing across the air flow path and spaced between the first ionizing assembly and the second ionizing assembly.

* * * * *